United States Patent
Lu

(10) Patent No.: US 10,016,960 B2
(45) Date of Patent: *Jul. 10, 2018

(54) SOUND INSULATION PANELS HAVING HIGH INTERLAYER THICKNESS FACTORS

(71) Applicant: SOLUTIA INC., St. Louis, MO (US)

(72) Inventor: Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,496

(22) Filed: Nov. 1, 2017

(65) Prior Publication Data

US 2018/0108340 A1 Apr. 19, 2018

Related U.S. Application Data

(63) Continuation of application No. 15/297,874, filed on Oct. 19, 2016, now Pat. No. 9,812,111.

(51) Int. Cl.
| | |
|---|---|
| *G10K 11/168* | (2006.01) |
| *B32B 17/10* | (2006.01) |
| *B32B 17/06* | (2006.01) |
| *B32B 37/06* | (2006.01) |
| *B32B 7/02* | (2006.01) |
| *G10K 11/16* | (2006.01) |
| *B32B 17/00* | (2006.01) |

(52) U.S. Cl.
CPC .. *B32B 17/10761* (2013.01); *B32B 17/10036* (2013.01); *B32B 2307/102* (2013.01)

(58) Field of Classification Search
CPC ............ G10K 11/168; B32B 17/10165; B32B 17/1055; B32B 17/10568; B32B 17/10807; B32B 17/10761; B32B 17/10036; B32B 17/10045; B32B 2307/10; B32B 2307/102; B32B 2250/05
See application file for complete search history.

(56) References Cited

U.S. PATENT DOCUMENTS

| | | | |
|---|---|---|---|
| 2,282,026 A | 5/1942 | Bren et al. | |
| 2,282,057 A | 5/1942 | Hopkins | |
| 2,640,904 A | 6/1953 | Gaiser | |

(Continued)

FOREIGN PATENT DOCUMENTS

| | | |
|---|---|---|
| CA | 2944082 A1 | 10/2015 |
| EP | 0022727 A2 | 1/1981 |

(Continued)

OTHER PUBLICATIONS

Lu, Jun; "Designing PVB Interlayer for Laminated Glass with Enhanced Sound Reduction"; The 2002 International Congress and Exposition on Noise Control Engineering; Paper 581; Aug. 19-21, 2002.

(Continued)

*Primary Examiner* — Edgardo San Martin
(74) *Attorney, Agent, or Firm* — Michelle Bugbee

(57) ABSTRACT

A multiple layer panel having improved sound insulation is disclosed. The multiple layer panel comprises a first rigid substrate having a first thickness $H_3$, a second rigid substrate having a second thickness $H_1$, wherein $H_3 \leq H_1$, and a multiple layer acoustic interlayer having a thickness $H_2$ between the first and second rigid substrates.

20 Claims, 4 Drawing Sheets

(56) References Cited

U.S. PATENT DOCUMENTS

| | | | |
|---|---|---|---|
| 3,282,772 | A | 11/1966 | Thiele |
| 4,243,719 | A | 1/1981 | Holmes |
| 5,190,826 | A | 3/1993 | Asahina et al. |
| 5,340,654 | A | 8/1994 | Ueda et al. |
| 5,766,755 | A | 6/1998 | Chaussade |
| 6,119,807 | A | 9/2000 | Benson, Jr. |
| 7,510,771 | B2 | 3/2009 | Lu |
| 8,147,973 | B2 | 4/2012 | Greer |
| 8,632,887 | B2 | 1/2014 | Iwamoto |
| 8,715,815 | B2 | 5/2014 | Shimamoto |
| 8,795,821 | B2 | 8/2014 | Shimamoto |
| 8,959,770 | B2 | 2/2015 | Nugue |
| 9,238,353 | B2 | 1/2016 | Nakamura |
| 9,812,111 | B1 * | 11/2017 | Lu .................. G10K 11/168 |
| 2005/0106372 | A1 | 5/2005 | Moran |
| 2006/0210782 | A1 | 9/2006 | Lu |
| 2010/0295331 | A1 | 11/2010 | Rehfeld |
| 2011/0045277 | A1 | 2/2011 | Greer |
| 2013/0236711 | A1 | 9/2013 | Lu |
| 2014/0227489 | A1 | 8/2014 | Inui |
| 2014/0363651 | A1 | 12/2014 | Lu |
| 2014/0363652 | A1 | 12/2014 | Lu |
| 2015/0064374 | A1 * | 3/2015 | Jain .................. B32B 17/10036 428/34 |
| 2015/0111016 | A1 | 4/2015 | Fisher |
| 2015/0224750 | A1 | 8/2015 | Visioli |
| 2015/0251377 | A1 * | 9/2015 | Cleary .................. B32B 3/263 428/172 |
| 2015/0314571 | A1 * | 11/2015 | Cites .................. B32B 17/06 428/215 |
| 2015/0347635 | A1 | 12/2015 | Shitanoki |
| 2016/0096349 | A1 | 4/2016 | Lu |
| 2016/0250982 | A1 | 9/2016 | Fisher |
| 2017/0050415 | A1 | 2/2017 | Kanki |
| 2017/0066223 | A1 | 3/2017 | Notsu |
| 2017/0100918 | A1 | 4/2017 | Lu |
| 2017/0106633 | A1 | 4/2017 | Lu |
| 2017/0239918 | A1 | 8/2017 | Nakamura |

FOREIGN PATENT DOCUMENTS

| | | |
|---|---|---|
| EP | 3144141 A1 | 3/2017 |
| JP | 2003 055007 A | 2/2003 |
| JP | 2003 202658 A | 9/2003 |
| WO | WO 2015 122507 A1 | 8/2015 |
| WO | WO 2015 158464 A1 | 10/2015 |

OTHER PUBLICATIONS

Lu, Jun et al.; "Windshields with New PVB Interlayer for Vehicle Interior Noise Reduction and Sound Quality Improvement"; 2003 SAE Noise & Vibration Conference; Society of Automotive Engineers Paper No. 2003-01-1587; Traverse City, MI; May 5-9, 2003.

Wade, Bruce E.; "Vinyl Acetal Polymers"; Encyclopedia of Polymer Science & Technology, 3d Edition, vol. 8; 2003; pp. 381-399.

Co-pending U.S. Appl. No. 15/297,858, filed Oct. 19, 2016; Jun Lu.

Notification of Transmittal of the International Search Report and the Written Opinion of the International Searching Authority, or the Declaration dated Dec. 22, 2017 received in International Patent Application No. PCT/US2017/055834.

Notification of Transmittal of the International Search Report and the Written Opinion of the International Searching Authority, or the Declaration dated Dec. 22, 2017 received in International Patent Application No. PCT/US2017/055838.

* cited by examiner 1-a 1-b

SOUND INSULATION PANELS HAVING HIGH INTERLAYER THICKNESS FACTORS

CROSS-REFERENCE TO RELATED APPLICATIONS

This is a continuation of U.S. patent application Ser. No. 15/297,874 filed Oct. 19, 2016 the disclosure of which is incorporated herein by reference in its entirety.

BACKGROUND

1. Field of the Invention

This disclosure relates to sound insulation multiple layer panels comprising a multilayer interlayer. More specifically, the present invention discloses multiple layer glass laminates having an interlayer thickness factor greater than about 0.80 and comprising a first glass sheet, a second glass sheet, and a multiple layer acoustic interlayer. The multiple layer glass laminates have improved sound insulation at the coincident frequency region of the laminates.

2. Description of Related Art

Poly(vinyl butyral) (PVB) is often used in the manufacture of polymer sheets that can be used as interlayers in multiple layer panels formed by sandwiching the interlayer between two sheets of glass or other rigid substrate. Such laminated glass or glass panel has long served for safety purposes and is often used as a transparent barrier in architectural and automotive applications. One of its primary functions is to absorb energy resulting from impact or a blow without allowing penetration of the object through the glass and to keep the glass bonded even when the applied force is sufficient to break the glass. This prevents dispersion of sharp glass shards, which minimizes injury and damage to people or objects within an enclosed area. Less known is the advantage of laminated glass for noise attenuation. Over the past decades, architectural use of laminated glass in buildings near airports and railways has served to reduce the noise levels inside the buildings, making it more comfortable for the occupants. Likewise this technology is now being used in buildings where street and highway traffic noise is a problem. Recently, advances in interlayer technology have made improved laminated glass that provides noise and vibration improvements for automotive glass.

Traditionally, glass panels used in automotive applications employ two glass sheets each having a thickness between 2.0 and 2.3 millimeters (mm). Most often, these sheets have approximately the same thickness. This type of configuration facilitates both strength and rigidity in the final panel, which, in turn, contributes to the overall mechanical strength and rigidity of the vehicle body. Some estimates attribute up to 30 percent of the overall rigidity of a vehicle to its glass. Thus, the design and rigidity of the multiple layer glass panels used for constructing vehicle glazings such as, for example, the windshield, sun or moon roof, and side and rear windows, are critical not only for the performance of those panels, but also for the overall performance of the vehicle itself.

Recent trends toward more fuel efficient vehicles have brought about demand for lighter weight vehicles. One way of reducing vehicle weight has been to reduce the amount of glass by using thinner glass sheets. For example, for a windshield having a 2.1 mm/2.1 mm glass configuration and a surface area of 1.4 m$^2$, reducing the thickness of one of the panels by about 0.5 mm can result in a weight reduction of over 10 percent, all other things being equal.

One approach to thinner multiple layer panels has been to use an "asymmetric" glass configuration, wherein one of the panels is thinner than the other. Thinner glass panels with symmetric configurations have also been used. However, the asymmetric configurations are more often employed and involve using an "outboard" glass panel (i.e., the glass panel facing outside of the vehicle cabin) with a traditional 2.0 mm to 2.3 mm thickness and a thinner "inboard" glass panel (i.e., the glass panel facing the interior of the cabin). The thicker outboard glass is to ensure adequate strength and impact resistance against rocks, gravel, sand, and other road debris to which the outboard panel would be subjected during use. Typically, however, these asymmetric panels have a combined glass thickness of at least 3.7 mm in order to maintain properties such as deflection stiffness, glass bending strength, glass edge strength, glass impact strength, roof strength, and torsional rigidity within acceptable ranges.

Further, because asymmetric configurations are typically formed by utilizing a thinner inboard glass sheet, the sound insulation properties of these panels are often poorer than similar panels utilizing thicker glass. Therefore, in order to minimize road noise and other disturbances within the cabin, interlayers used to form asymmetric multiple layer panels are generally interlayers having acoustic or sound dampening or sound insulating properties (i.e., acoustic interlayers). Conventional, non-acoustic interlayers do not provide sufficient sound insulation for most applications requiring good sound insulation.

The noise transmission through the glazing is a major contributor to the consumer's perception of vehicle interior noise level. The windshield and side windows are of particular importance for the interior noise level and are one of the acoustic limitations to designing quieter car interiors. Acoustic energy can be transmitted rather easily through windshields and side windows compared to other areas of the passenger compartment boundaries. At high operating speeds, aerodynamic pressure fluctuations resulting from exterior airflow in the vicinity of the windshield and side windows are very strong, causing the glass surface to radiate noise to the vehicle interior. Airflows impinging on panel edges and bends can generate acoustic noise with subsequent airborne transmission to the vehicle interior. The transmission of airborne noise generated by adjacent moving vehicles and structure-borne noise due to structural vibration of the car body also contribute to noise transmission through windshields and side windows.

The sound insulation property of a glass panel can be characterized by Sound Transmission Loss (STL). Glass reacts best to excitation frequencies that matches its natural frequencies. Because of low internal damping, glass resonates readily at low frequencies, which are determined by stiffness, mass and dimensions of a glass panel, and increases sound transmission. Above the low frequency resonant region to below the coincident frequency region (typically 300 Hertz (Hz) to less than 2500 Hz for a windshield or side glass), the mass of glass dominates the sound transmission and the glass follows the mass law of acoustics. In the mass law controlled region, the sound transmission loss increases about 6 decibels (dB) with increasing frequency by one octave band, and increases about 6 dB by doubling the glass thickness or surface density of the glass. Traditionally, the surface density of a glass panel is increased by increasing the thickness of one or both glass sheets.

It is well known that sound transmission through glass exhibits coincident effect. Glass has a specific critical or coincident frequency at which the speed of an incident acoustical wave in air matches that of the glass bending wave. At the coincident frequency, the acoustic wave is especially effective at causing glass to vibrate, and the vibrating glass is an effective sound radiator at or near the coincident frequency and at frequencies above or below the coincident frequency or in the coincident frequency region. As a result, glass exhibits a dip or decrease in sound transmission loss, referred to as the coincidence dip or coincident effect, and the glass becomes transparent to sound.

The coincident frequency can be represented by equation (1):

$$f_c = c^2/2\pi \times [\rho_s/B]^{1/2} \quad (1)$$

where c is the sound speed in air, $\rho_s$ is the surface density of the glass panel, and B is the bending stiffness of the glass panel. In general, the coincident frequency increases with decreasing thickness of the glass panel. For automotive glazings, the coincident frequency is typically in the range of 3150 to 6300 Hz, which is well within the wind noise frequency region of 2000 to 8000 Hz. For laminated architectural building glass (such as windows), the coincident frequency is generally less than about 3150 Hz.

The coincident effect not only results in a dip or decrease in sound transmission loss at the coincident frequency, but also reduces sound transmission loss in the coincident frequency region. Glass panels exhibiting severe coincident effect (low STL) at the coincident frequency will transmit sound more dominantly at that frequency, resulting in an enclosed area (such as the interior of a car or a room in a building) with high sound intensity at or near the coincident frequency.

As previously stated, increasing sound transmission loss of a laminated glass in the mass controlled frequency region is traditionally achieved by increasing the surface density of the laminate, such as by increasing the combined thickness of glass. However, this approach results in little to no change, or even a negative change at the coincident frequency of a laminated glass panel that has either a high or low symmetry of glass configuration (further described below). In addition, the sound transmission loss in the frequency range of 3000 to 5000 Hz is adversely affected.

Thus, a need exists for an alternative solution to increase sound transmission loss in the mass controlled frequency region that also improves sound transmission loss in coincident frequency region.

SUMMARY

One embodiment of the present invention is a sound insulating multiple layer panel comprising: a first rigid substrate having a first thickness $H_3$, a second rigid substrate having a second thickness $H_1$, wherein $H_3 \leq H_1$, and a multiple layer acoustic interlayer having a thickness $H_2$ between the first and second rigid substrates, wherein the multiple layer interlayer comprises a first stiff layer having a stiff layer thickness, a second stiff layer having a second stiff layer thickness, and a soft layer between the first and second stiff layers, and wherein the multiple layer panel has an interlayer thickness factor, $I_f$, of at least 0.80, wherein $I_f = (H_2 - 0.84) \div [(H_1 + H_3)(H_1 + H_2 + H_3)] \times 100$.

Another embodiment is an asymmetric sound insulating multiple layer panel comprising: a first rigid substrate having a first thickness $H_3$, a second rigid substrate having a second thickness $H_1$, wherein $H_3 < H_1$, and a multiple layer acoustic interlayer having a thickness $H_2$ between the first and second rigid substrates, wherein the multiple layer interlayer comprises a first stiff layer having a stiff layer thickness, a second stiff layer having a second stiff layer thickness, and a soft layer between the first and second stiff layers, wherein the soft layer is non-centrally positioned in the interlayer, and wherein the multiple layer panel has an interlayer thickness factor, $I_f$, of at least 0.80, wherein $I_f = (H_2 - 0.84) \div [(H_1 + H_3)(H_1 + H_2 + H_3)] \times 100$.

Another embodiment is a method for increasing the surface density of a multiple layer panel to improve the sound transmission loss at the coincident frequency region of the panel, the method comprising the steps of: providing a first rigid substrate having a thickness of $H_3$; providing a second rigid substrate having a thicknesses of $H_1$; providing a multiple layer interlayer having a thickness of $H_2$, determining the interlayer thickness factor, $I_f$, of the multiple layer panel according to the equation: $I_f = (H_2 - 0.84) \div [(H_1 + H_3)(H_1 + H_2 + H_3)] \times 100$; increasing the interlayer thickness factor $I_f$ of the panel to at least 0.80; placing the interlayer between the first rigid substrate and the second rigid substrate to provide a pre-laminate; and subjecting the pre-laminate to heat and pressure to form a multiple layer panel having improved sound transmission loss.

Also included are multiple layer panels made by the method of the invention.

DETAILED DESCRIPTION

Figure 1A:
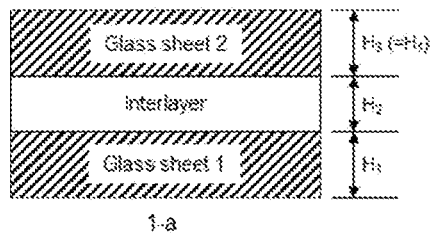
FIG. 1a depicts a multiple layer glass panel with a symmetric glass configuration.

The present invention discloses multiple layer panels or laminates having a certain interlayer thickness factor. More specifically, the present invention discloses multiple layer panels or laminates comprising a first rigid substrate or sheet having a first substrate or sheet thickness, a second rigid substrate or sheet having a second substrate or sheet thickness, and a multiple layer acoustic interlayer comprising at least two stiff layers or skin layers and at least one soft layer or core layer disposed between and in contact the stiff layers, wherein the multiple layer panel has an interlayer thickness factor greater than about 0.80. The multiple layer panel has a symmetry of substrate (or symmetry of glass) less than or equal to 1, a symmetry of core layer less than or equal to 1, and the acoustic interlayer may comprise more than one core layer or soft layer, as further described below.

It is well known that doubling the surface density of a multiple layer panel such as a laminated glass panel increases the sound transmission loss in the mass controlled frequency region by about 6 decibels (dB). In other words, the sound transmission loss in the mass controlled frequency region increases as the surface density of a multiple layer panel is increased. Traditionally, the surface density is increased by increasing the combined substrate thickness or combined glass thickness. However, this approach results in little change at the coincident frequency of a laminated glass and can adversely affect the sound transmission between the frequencies of 3000 and 5000 Hz.

According to the present invention, it has now been surprisingly discovered that increasing the interlayer thickness factor of a multiple layer panel such as a laminated glass panel offers an alternative method to increase the surface density of the panel and improve not only the sound transmission loss in the mass controlled frequency region but also at the coincident frequency and at frequencies between 3000 and 5000 Hz. Stated differently, increasing the interlayer thickness factor of a multiple layer panel to increase its surface density also improves the sound transmission loss in the frequency range of between 3000 and 5000 Hz, which cannot be achieved by increasing the combined substrate thickness of the multiple layer panel to the same surface density. For example, consider two multiple layer glass panels A and B. Glass panel A contains two sheets of glass and an acoustic interlayer A, and glass panel B contains two sheets of glass and an acoustic interlayer B. Glass panel B has a combined glass thickness (Ti) less than the combined glass thickness of glass panel A. The interlayer thickness factor of glass panel B is greater than the interlayer thickness factor of glass panel A, and glass panels A and B have the same surface density and the same sound transmission loss in the mass controlled frequency region. As a result, glass panel B exhibits higher sound transmission loss at the coincident frequency and at frequencies between 3000 and 5000 Hz (that is, glass panel B has better sound insulation than glass panel A because the interlayer thickness factor of glass panel B is greater). Increasing the interlayer thickness factor of glass panel B (compared to that of glass panel A) improves the sound transmission loss at the coincident frequency and at frequencies between 3000 and 5000 Hz more than increasing the combined glass thickness of glass panel A does.

In embodiments, improvements of up to about 4 dB at the coincident frequency and up to 2, or up to 3 dB in the frequencies between 3000 and 5000 Hz can be achieved by increasing the interlayer thickness factor of a multiple layer glass panel. Thus, increasing interlayer thickness factor of a multiple layer panel to increase its surface density is an effective method to improve the sound insulation property of a multiple layer panel. The present invention discloses a method to increase the surface density of multiple layer panels by increasing the interlayer thickness factor of the panels. More specifically, the present invention discloses a method for increasing sound transmission loss over a broad frequency region, e.g., from about 200 Hz to about 10000 Hz, by increasing the interlayer thickness factor of the panel.

Multiple layer panels as described herein generally comprise a first rigid substrate sheet having a first substrate thickness and a second rigid substrate sheet having a second substrate thickness. Each of the first and second substrates can be formed of a rigid material, such as glass, and may be formed from the same, or from different, materials. In some embodiments, at least one of the first and second substrates can be a glass substrate, while, in other embodiments, at least one of the first and second can be formed of another material including, for example, a rigid polymer such as polycarbonate, copolyesters, acrylic, polyethylene terephthalate, and combinations thereof. In embodiments, both rigid substrates are glass. Any suitable type of non-glass material may be used to form such a substrate, depending on the required performance and properties. Typically, none of the rigid substrates are formed from softer polymeric materials, including thermoplastic polymer materials as described in detail below.

Any suitable type of glass may be used to form the rigid glass substrate, and, in some embodiments, the glass may be selected from the group consisting of alumina-silicate glass, borosilicate glass, quartz or fused silica glass, and soda lime glass. The glass substrate, when used, may be annealed, thermally-strengthened or tempered, chemically-tempered, etched, coated, or strengthened by ion exchange, or it may have been subjected to one or more of these treatments. The glass itself may be rolled glass, float glass, or plate glass. In some embodiments, the glass may not be chemically-treated or strengthened by ion exchange, while, in other embodiments, the glass may not be an alumina-silicate glass. When the first and second substrates are glass substrates, the type of glass used to form each substrate may be the same or different.

The rigid substrates can have any suitable thickness. In some embodiments, when the rigid substrates are all glass substrates, the nominal thickness of at least one of the glass sheets (first or second glass) ranges from 0.1 mm to 12.7 mm and the multiple layer glass panels include the configurations of any combinations of the first and second glass sheets (and any other glass or rigid sheets, if desired). In some embodiments, the nominal thickness of the first and/or second substrates can be at least about 0.4, at least about 0.7, at least about 1.0, at least about 1.3, at least about 1.6, at least about 1.9, at least about 2.2, at least about 2.5, or at least about 2.8 and/or less than about 3.2, less than about 2.9, less than about 2.6, less than about 2.3, less than about 2.0, less than about 1.7, less than about 1.4, or less than about 1.1 mm. Additionally, or in the alternative, the first and/or second substrates can have a nominal thickness of at least about 2.3, at least about 2.6, at least about 2.9, at least about 3.2, at least about 3.5, at least about 3.8, or at least about 4.1 and/or less than about 12.7, less than about 12.0, less than about 11.5, less than about 10.5, less than about 10.0, less than about 9.5, less than about 9.0, less than about 8.5, less than about 8.0, less than about 7.5, less than about 7.0, less than about 6.5, less than about 6.0, less than about 5.5, less than about 5.0, or less than about 4.5 mm. Other thicknesses may be appropriate depending on the application and properties required.

Figure 1B:
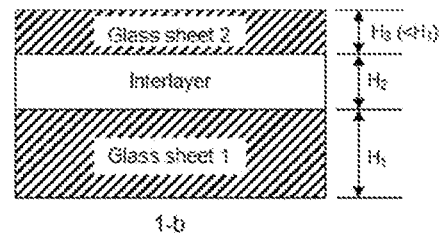
FIG. 1b depicts a multiple layer glass panel with an asymmetric glass configuration.

When multiple layer panels include two substrates having the same nominal thickness such panels may be referred to as "symmetric configurations," as shown in FIG. 1a, because the ratio of the nominal thickness of one substrate to the nominal thickness of the other substrate equals 1. When multiple layer panels include two substrates having different nominal thicknesses such panels may be referred to as "asymmetric configurations," as shown in FIG. 1b, because the ratio of the nominal thickness of one substrate to the nominal thickness of the other substrate does not equal 1. As used herein, asymmetric configurations or asymmetric panels are characterized in that the ratio of the thicknesses of the substrates (thinner substrate to thicker substrate) is less than 1, and symmetric configurations or symmetric panels are characterized in that the ratio of the thicknesses of the substrates is equal to 1 (i.e., the substrates have the same thickness).

In embodiments, the multiple layer panel may include two substrates having the same nominal thickness. In other embodiments, the multiple layer panel may include two substrates having different nominal thicknesses, as shown in FIG. 1b. As used herein, the terms "symmetry of substrate" and "symmetry of glass" refer to the ratio of the nominal thickness of the first or thinner substrate (or glass sheet) to the nominal thickness of the second or thicker substrate (or glass sheet), and the terms may be used interchangeably. The "symmetry of glass" is determined by equation (2):

$$\text{Symmetry of Glass } (S_G) = H_3/H_1 \qquad (2)$$

where $H_3$ is the nominal thickness of the thinner (first) glass substrate, $H_1$ is the nominal thickness of the thicker (second) glass substrate, and $H_3 \leq H_1$. FIG. 1a depicts a cross-section of a panel having a symmetric configuration, and FIG. 1b depicts a cross-section of a panel having an asymmetric configuration.

As used herein, when referring to a multiple layer glass panel the term "symmetrically configured" means having a symmetry of glass, $S_G$, equal to 1, and the term "asymmetrically configured" means having a symmetry of glass of less than 1. The terms "symmetry of glass", "symmetrically configured", "symmetrical configuration" and "symmetry of glass configuration" may be used interchangeably throughout. The terms "asymmetrically configured" and "asymmetrical configuration" may be used interchangeably throughout.

In embodiments, multiple layer panels as described herein can have a symmetry of glass of at least about at least about 0.10, at least about 0.15, at least about 0.20, at least about 0.23, at least about 0.25, at least about 0.30, at least about 0.35, at least about 0.40, at least about 0.45, at least about 0.50, at least about 0.55, at least about 0.60, at least about 0.65, at least about 0.70, at least about 0.75 and/or about 1, not more than about 0.99, not more than about 0.97, not more than about 0.95, not more than about 0.90, not more than about 0.85, not more than about 0.80, not more than about 0.75, not more than about 0.70, not more than about 0.65, not more than about 0.60, not more than about 0.55, not more than about 0.50, not more than about 0.45, not more than about 0.40, not more than about 0.35, not more than about 0.30. In some embodiments, multiple layer panels as described herein may be symmetrical and have a symmetry of glass of 1.

When the multiple layer panel has an asymmetric configuration, the difference between the nominal thickness of the thicker substrate and the nominal thickness of the thinner substrate can be at least about 0.05 mm. In some embodiments, at least one glass sheet has a nominal thickness that can be at least about 0.1, at least about 0.2, at least about 0.3, at least about 0.4, at least about 0.5, at least about 0.6, at least about 0.7, at least about 0.8, at least about 0.9, at least about 1.0, at least about 1.2, at least about 1.6, at least about 2.0, at least about 3.0, or at least about 4.0 mm thicker than the nominal thickness of at least one of the other glass sheets, or each of the other glass sheets.

The specific glass configuration may be selected depending on the ultimate end use of the multiple layer panel. For example, in some embodiments wherein the multiple layer panel is utilized in automotive applications, the nominal thickness of one substrate can be in the range of from 0.1 to 2.6 mm, from 0.3 to 2.0 mm, or from 0.5 to 1.8 mm, while the nominal thickness of the other substrate can be in the range of from 0.5 to 3.0 mm, from 0.6 to 2.8 mm, from 1.0 to 2.6, or from 1.6 to 2.4 mm. The sum of the thicknesses of the substrates ($H_3+H_1$) can be less than 4.6, less than 4.2, less than 4.0, less than 3.7, less than 3.4, or less than 3.2 mm. The ratio of the nominal thicknesses (the symmetry of glass, $S_G$) can be in the ranges previously defined. Other thicknesses and symmetry of glass values may be used as appropriate, depending on the desired application and performance.

In other embodiments, such as wherein the multiple layer panel is utilized in aeronautical or architectural applications, the nominal thickness of one substrate may be in the range of from 2.2 to 12.7 mm, from 2.6 to 8 mm, or from 2.8 to 5 mm, while the nominal thickness of the other substrate may be in the range of from 1.6 to 12.6 mm, from 1.8 to 7.5 mm, or from 2.3 to 5 mm. The sum of the thicknesses of the substrates ($H_3+H_1$) in these embodiments can be greater than 4.6 mm, greater than 5.0 mm, greater than 5.5 mm, or greater than 6 mm. The symmetry of glass, $S_G$, can be in the ranges previously defined. Other thicknesses and symmetry of glass values may be used as appropriate, depending on the desired application and performance.

In addition to the rigid substrates, multiple layer panels as described herein include at least a polymeric multilayer acoustic interlayer disposed between and in contact with each of the first and second rigid substrates. As used herein, the terms "multilayer interlayer", "polymer multilayer interlayer" and "polymeric multilayer interlayer" refer to a multiple layer polymer sheet suitable for use in forming multiple layer panels. As used herein, the terms "single layer" and "monolithic" refer to interlayers formed of one single polymer layer, while the terms "multiple layer" or "multilayer" refer to interlayers having two or more polymer layers adjacent to and in contact with one another that are coextruded, laminated, or otherwise coupled to one another. Each polymer layer of an interlayer may include one or more polymeric resins, optionally combined with one or more plasticizers, which have been formed into a sheet by any suitable method. One or more of the polymer layers in an interlayer may further include additional additives, although these are not required.

As used herein, the terms "first," "second," "third," and the like are used to describe various elements, but such elements should not be unnecessarily limited by these terms. These terms are only used to distinguish one element from another and do not necessarily imply a specific order or even a specific element. For example, an element may be regarded as a "first" element in the description and a "second" element in the claims without being inconsistent. Consistency is maintained within the description and for each of the independent claims, but such nomenclature is not necessarily intended to be consistent therebetween. Such three-layer (or tri-layer) interlayers may be described as having at least one inner "core" layer sandwiched between two outer "skin" layers.

As used herein, the terms "polymer resin composition" and "resin composition" refer to compositions including one or more polymer resins. Polymer compositions may optionally include other components, such as plasticizers and/or other additives.

Figure 2A:
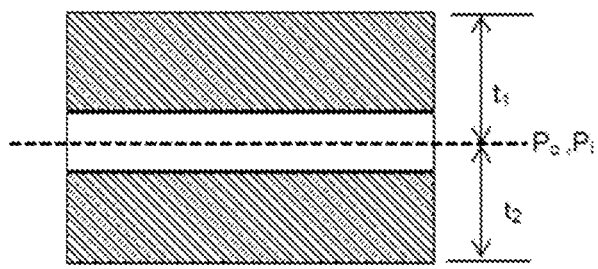
FIG. 2a shows a symmetric tri-layer interlayer with the soft layer in a centered position in the interlayer.

In embodiments, the multilayer interlayer comprises two stiff layers or skin layers and one soft layer or core layer, and the soft layer is between and in contact with the two stiff layers. The core layer is either centrally positioned, as shown in FIG. 2a, or non-centrally positioned as shown in FIG. 2b.

Figure 2B:
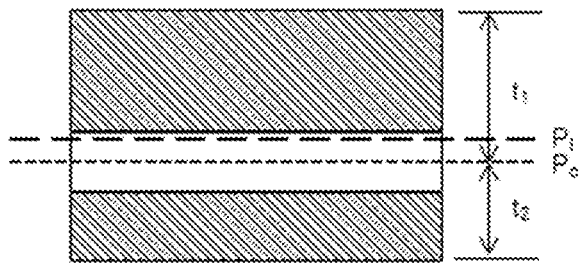
FIG. 2b shows an asymmetric tri-layer interlayer with the soft layer positioned off-center in the interlayer.

A multiple layer interlayer having a core layer that is non-centrally positioned, is also referred to herein as an "asymmetric interlayer" or "asymmetric core layer", and is characterized in that the center plane of the core layer ($P_c$) is off the geometry center plane of the multilayer interlayer ($P_I$) and the ratio of the thickness from the center plane of the core layer to the outer surface of the thinner stiff layer ($t_2$) to the thickness from the center plane of the core layer to the outer surface of the thicker stiff layer ($t_1$) is less than 1 (see FIG. 2b). This ratio of thicknesses ($S_I$), as used herein, is referred to as the "symmetry of core layer" or "symmetry of interlayer", and may be shown by equation (3):

$$S_I = t_2/t_1 \quad (3)$$

where $t_2$ is the thickness from the center plane of the core layer to the outer surface of thinner stiff layer and $t_1$ is the thickness from the center plane of the core layer to the outer surface of the thicker stiff layer, and $t_2 \leq t_1$. The symmetric multiple layer acoustic interlayer (e.g., the symmetry of core layer equals 1) is characterized in that the center plane of the core layer ($P_c$) is superimposed on the geometry center plane of the multilayer interlayer ($P_I$) and the ratio of the thickness from the center plane of the core layer to one of the outer surfaces of the stiff layers ($t_1$, $t_2$) to the thickness from the center plane of the core layer to another outer surface of the stiff layers is 1 (see FIG. 2a). When $t_1=t_2$, $S_I=1$.

As used herein, the terms "symmetrically configured core layer" and "symmetrically configured interlayer" refer to a multilayer interlayer having a symmetry of core layer (Si) of 1, and the term "symmetry of core layer" and "symmetry of interlayer" may be used interchangeably. When an interlayer contains multiple core (soft) layers, the symmetry of each of the core layers can be calculated as described above.

In embodiments, the center plane of the core layer ($P_c$) can be at any asymmetric position relative to the geometry center plane of the interlayer ($P_I$), as desired. In embodiments of asymmetric multiple layer panels where one substrate is thicker than the other, the center plane of the core layer can be located closer to the thinner substrate ($H_3$), or the center plane of the core layer can be located closer to the thicker substrate ($H_1$). In some embodiments, the multilayer acoustic interlayer as described herein can have a symmetry of core layer of greater than about 0.01. The range of the symmetry can be from 0.01 to 1, from 0.02 to 0.9, from 0.04 to 0.8, or from 0.05 to 0.7. In embodiments, multilayer acoustic interlayers as described herein can have a symmetry of core layer of less than or equal to 1, less than 0.90, less than 0.80, less than 0.70, less than 0.60, less than 0.50, less than 0.40, and/or greater than 0, greater than about 0.01, greater than about 0.05, greater than 0.10, greater than 0.20, or greater than about 0.35 or more. In embodiments, the multilayer acoustic interlayer can have a symmetry of core layer of 1 (that is, the interlayer can be symmetrical).

In embodiments, the multilayer acoustic interlayer comprises at least one soft or core layer, while in other embodiments, the multilayer acoustic interlayer comprises at least two soft layers, at least three soft layers, at least four soft layers, at least five soft layers, or at least six soft layers or more. In embodiments, an asymmetric multilayer acoustic interlayer comprising more than one soft or core layer, (i.e., two or more soft layers) provides more improvement in sound insulation of an asymmetric glass panel in the coincident frequency region and is therefore more advantageous than an asymmetric multilayer acoustic interlayer comprising only one soft layer.

When the asymmetric multilayer acoustic interlayers comprise two, three, or more soft layers, the soft layers can be the same or different and may be positioned in the interlayer in different configurations or positions, so long as at least one of the soft layers is asymmetrically configured (the symmetry of core layer is less than 1). For example, the interlayer may comprise at least two soft layers where at least two soft layers are asymmetrically configured, or at least one soft layer is asymmetrically configured and at least one soft layer is symmetrically configured. When there are two or more soft layer that are asymmetrically configured, the symmetry of the core layer of each can be the same or different.

The surface density of a multiple layer panel can be calculated by equation (4):

$$\rho_s = (H_3+H_1) \times \rho_g/1000 + H_2 \times \rho_I/1000 \quad (4)$$

where $\rho_g$ is the density of glass (in kg/m³), $\rho_I$ is the density of interlayer (in kg/m³), $H_3$ and $H_1$ are the thicknesses of the two glass sheets in mm, and $H_2$ is the thickness of interlayer in millimeters.

The inventors have found that the surface density ($\rho_s$, in kg/m²) of a multilayer glass panel can be increased by increasing the interlayer thickness factor ($I_f$) of the glass panel. The interlayer thickness factor of a glass panel is a measure of the contribution from an interlayer to the surface density of the glass panel, thus to the sound transmission loss at the mass controlled frequency region and frequency region at and above the coincident frequency. The interlayer thickness factor of a multiple layer glass panel is determined according to the equation (5):

$$I_f = (H_2 - 0.84) \div [(H_1+H_3)(H_1+H_2+H_3)] \times 100 \quad (5)$$

where $H_1$, $H_2$ and $H_3$ are as defined above. For a glass panel containing an interlayer having a thickness less than or equal to 0.84 mm, the contribution of the interlayer thickness to the improvement of STL of the laminated glass is zero (0). To illustrate the contribution of interlayer thickness factor, consider the following examples. In a first example, a 2.1 mm/1.6 mm glass panel has an interlayer of 1 mm thick, a surface density of 10.3 kg/m², and the $I_f$ is 0.92. In this example, the interlayer contributes 10.3% to the surface density. In a second example, a 2.3 mm/2.3 mm glass panel has an interlayer of 1 mm thick, a surface density of 12.6 kg/m², and an interlayer thickness factor of 0.62, and the interlayer contributes 8.5% to the surface density. There is a greater contribution from the interlayer in the first example. In another example, for a 2.1 mm/1.6 mm glass panel having an interlayer of 3.1 mm thick, a surface density of 12.6 kg/m² and an interlayer thickness factor of 9.0 the interlayer contributes 26.2% to the surface density while for a 2.3 mm/2.3 mm glass panel having an interlayer of 1 mm thick, a surface density of 12.6 kg/m², and an interlayer thickness factor of 0.62, the interlayer contributes only 8.5% to the surface density. The first panel again has a greater contribution from the interlayer to the surface density than the second panel.

Figure 3:
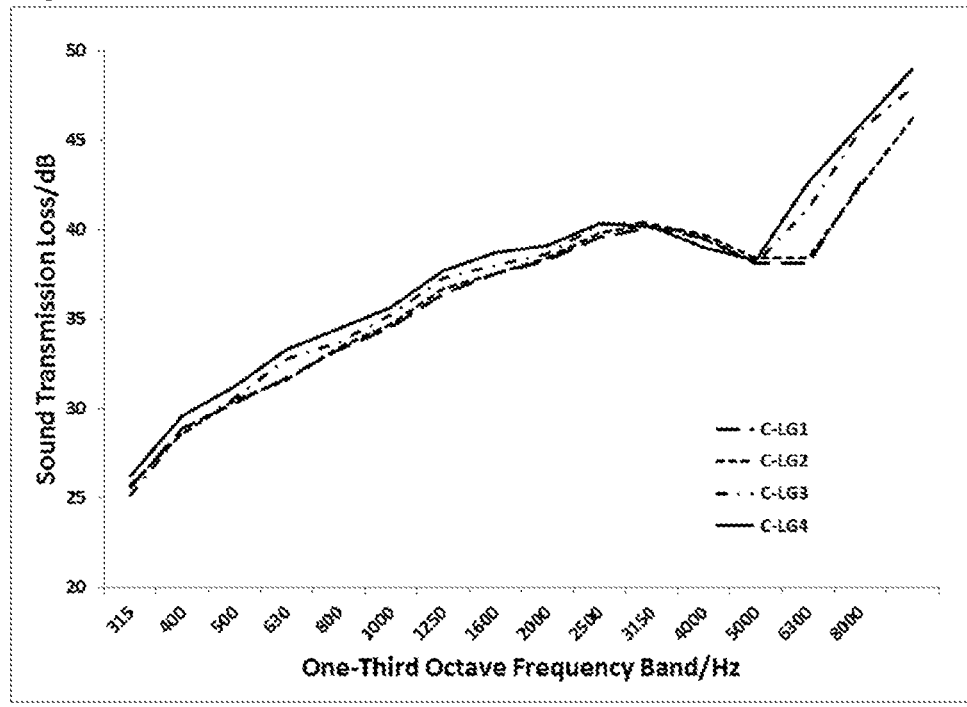
FIG. 3 is a graph of the sound transmission loss of several multiple layer panels formed and tested as described in Example 1.
Figure 4:
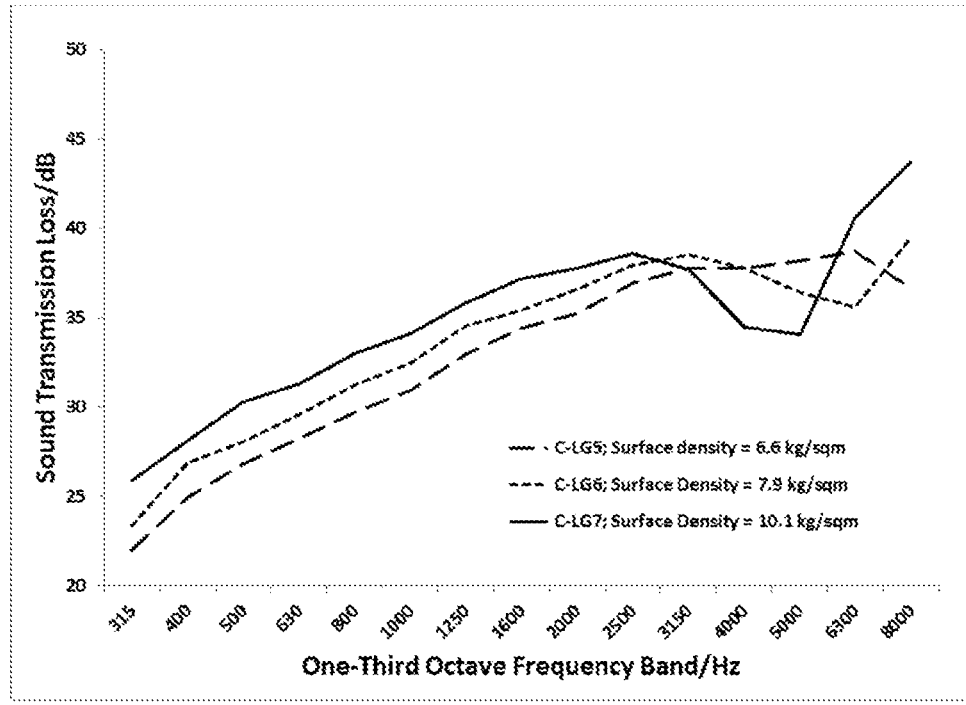
FIG. 4 a graph of the sound transmission loss of several additional multiple layer panels formed and tested as described in Example 1.

As previously discussed, the sound transmission loss of a multiple layer glass panel in the mass controlled frequency region can be increased by increasing the interlayer thickness factor of the panel, which is more effective than the conventional approach of increasing the combined glass thickness to increase the STL. The conventional approach of increasing combined thickness results in little change in the sound transmission loss at the coincident frequency because the sound transmission loss at the coincident frequency is essentially independent of the combined glass thickness of a multiple layer glass panel, and increasing the combined glass thickness can adversely affect the sound transmission between the frequencies of 3000 and 5000 Hz. For example, a conventional symmetric glass panel containing a symmetric multilayer acoustic interlayer (symmetry of core layer of 1) and an interlayer thickness factor of 0 has sound insulation as measured by sound transmission loss (STL) at the coincident frequency essentially independent of the combined glass thickness and a small drop in the sound insulation in the frequencies between 3000 and 5000 Hz, as shown in FIG. 3. A conventional low symmetry glass panel containing a symmetric multilayer acoustic interlayer (symmetry of core layer is 1) and an interlayer thickness factor of 0 has decreased sound insulation as measured by sound transmission loss in the coincident frequency region, in addition to decreased sound transmission loss in the frequencies between 3000 and 5000 Hz, as the symmetry of glass is reduced, even though the combined glass thickness is increased, as shown in FIG. 4.

In one conventional asymmetric glass panel (configuration of 1.6 mm/0.7 mm, $S_G$=0.44, combined glass thickness=2.3 mm, $\rho_s$=6.6 kg/m²) having a symmetric acoustic interlayer (symmetry of core layer of 1) and an interlayer thickness factor of 0, the sound transmission loss is 1 dB higher at the coincident frequency and up to 4 dB higher in the frequencies between 3000 and 5000 Hz than a second conventional asymmetric glass panel (configuration of 3.0 mm/0.7 mm, $S_G$=0.23, combined glass thickness=3.7 mm, $\rho_s$=10.1 kg/m²) having a symmetric acoustic interlayer (symmetry of core layer of 1) and an interlayer thickness factor of 0.

In embodiments, symmetric multiple layer glass panels having an interlayer thickness factor of 3.1 to 6 improve sound insulation as measured by sound transmission loss in the coincident frequency region by up to 0.8 to 2.7 dB over a conventional symmetric multiple glass panel having the interlayer thickness factor of 0. In other embodiments, asymmetric laminated glass panels ($S_G$=0.23) having an interlayer thickness factor of 3.9 to 7.3 improve sound insulation as measured by sound transmission loss in the coincident frequency region by up to 1.7 to up to 4.2 dB over a conventional asymmetric laminated glass panel ($S_G$=0.23) having an interlayer thickness factor of 0. In other embodiments, asymmetric laminated glass panels ($S_G$=0.76) having an interlayer thickness factor of 3.9 to 7.3 improve sound insulation as measured by sound transmission loss in the coincident frequency region by up to 0.7 to up to 2.9 dB over a conventional asymmetric laminated glass panel ($S_G$=0.76) having an interlayer thickness factor of 0. Increasing the interlayer thickness factor of a multiple layer glass panel in general improves the sound transmission loss at the coincident frequency of the panel and in the frequencies between 3000 and 5000 Hz, and the improvement is more efficient or effective with asymmetric glass configurations than symmetric glass configurations, particularly for asymmetric configurations having a symmetry of glass less than 0.76.

In embodiments, the interlayer thickness factor of the multiple layer panel according to some embodiments of the present invention can be at least about 0.80, at least about 0.90, at least about 1.0, at least about 1.5, at least about 2.0, at least about 3.0, at least about 4.0, at least about 5.0, at least about 10, or at least about 20 and/or not more than about 76, not more than about 60, not more than about 50, not more than about 40, not more than about 30, not more than about 25 with the multilayer interlayer thickness in the range of 34 mils to 180 mils (1 mil=0.0254 mm). Other interlayer thickness factors may be used as desired for a particular application. If the interlayer is not laminated between two substrates, its average thickness can be determined by directly measuring the thickness of the interlayer using a caliper, or other equivalent device. If the interlayer is laminated between two substrates, its thickness can be determined by subtracting the combined thickness of the substrates from the total thickness of the multiple layer panel.

In some embodiments, one or more polymer layers can have an average thickness at least about 1, at least about 2, at least about 3, at least about 4, at least about 5, at least about 6, at least about 7, at least about 8, at least about 9, or at least about 10 mils or more. Additionally, or in the alternative, one or more of the polymer layers in an interlayer as described herein can have an average thickness of not more than about 25, not more than about 20, not more than about 15, not more than about 12, not more than about 10, not more than about 8, not more than about 6, not more than about 4, or not more than about 2 mils, although other thicknesses may be used as desired.

In some embodiments, the layers or interlayers can comprise flat polymer layers having substantially the same thickness along the length, or longest dimension, and/or width, or second longest dimension, of the sheet, while, in other embodiments, one or more layers of a multilayer interlayer, for example, can be wedge-shaped or can have a wedge-shaped profile, such that the thickness of the interlayer changes along the length and/or width of the sheet, such that one edge of the layer or interlayer has a thickness greater than the other. When the multilayer interlayer, such as a stiff/soft/stiff tri-layer, is wedge-shaped at least the soft layer and one of the stiff layers of the interlayer can be wedge-shaped. Wedge-shaped interlayers may be useful in, for example, heads-up-display (HUD) panels in automotive and aircraft applications. The interlayer thickness factor of a multiple layer panel comprising a wedge-shaped interlayer can be determined according to equation (5) with $H_2$ equal to the thickness of the lowest thickness of the interlayer (usually one of the edges of the length or width of the sheet).

Examples of suitable thermoplastic polymers can include, but are not limited to, poly(vinyl acetal) resins, polyurethanes (PU), poly(ethylene-co-vinyl acetate) resins (EVA), polyvinyl chlorides (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and ionomers thereof, derived from any of the previously-listed polymers, and combinations thereof. In some embodiments, one or more layers of a multiple layer interlayer can include a thermoplastic polymer which can be selected from the group consisting of poly(vinyl acetal) resins, polyvinyl chlorides, polyethylene vinyl acetates, and polyurethanes. In certain embodiments, one or more of the polymer layers can include at least one poly(vinyl acetal) resin. Although generally described herein with respect to poly(vinyl acetal) resins, it should be understood that one or more of the above polymer resins could be included with, or in place of, the poly(vinyl acetal) resins described below in accordance with various embodiments of the present invention.

Polyurethanes suitable for use in the layers and interlayers can have different hardnesses. An exemplary polyurethane polymer has a Shore A hardness less than 85 per ASTM D-2240. Examples of polyurethane polymers are AG8451 and AG5050, aliphatic isocyanate polyether based polyurethanes having glass transition temperatures less than 20° C. (commercially available from Thermedics Inc. of Woburn, Mass.). EVA polymers can contain various amounts of vinyl acetate groups. The desirable vinyl acetate content is generally from about 10 to about 90 mol %. EVA with lower vinyl acetate content can be used for sound insulation at low temperatures. When included, the ethylene/carboxylic acid copolymers are generally poly(ethylene-co-methacrylic acid) and poly(ethylene-co-acrylic acid) with a carboxylic acid content of from about 1 to about 25 mol %. Ionomers of ethylene/carboxylic acid copolymers can be obtained by partially or fully neutralizing the copolymers with a base, such as the hydroxide of alkali (sodium for example) and alkaline metals (magnesium for example), ammonia, or other hydroxides of transition metals such as zinc. Examples of ionomers that are suitable include Surlyn® ionomers resins (commercially available from DuPont of Wilmington, Del.).

Multiple layer interlayers used in the glass panels of the invention include any interlayer having at least two layers and having acoustic properties, such as multiple layer acoustic interlayers comprising at least a first stiff layer, a second stiff layer, and a third soft layer disposed between the first and second stiff layers. Additional numbers of layers and interlayer combinations are possible, such as, soft/stiff/soft, soft/stiff/soft/stiff/soft, stiff/soft/stiff/soft/stiff, stiff/soft/soft/stiff, and other embodiments known to one skilled in the art. Multilayer acoustic interlayers suitable for use in multiple layer glass panels of the present invention include interlayers comprising a soft layer with one or more physical characteristics modified in order to increase the acoustic dampening property and reduce the sound transmission through the glass and stiff outer layers, usually skin layers, providing handling, processability, and mechanical strength of the interlayer. As used herein, "stiff layer" or "stiffer layer" generally refers to a layer that is stiffer or more rigid than another layer and that has a glass transition temperature that is generally at least two (2) degrees C. higher than another layer. As used herein, the "soft layer" or "softer layer" generally refers to a layer that is softer than another layer and that has a glass transition temperature that is generally at least two (2) degrees C. lower than another layer. One of the unique physical characteristics that is modified in order to achieve the improved sound insulation property is the lower glass transition temperature of the soft (core) layer. In embodiments, a suitable glass transition temperature of the soft layer is less than about 25, less than about 20, less than about 15, less than about 10, less than about 5, less than about 0, or less than about −5° C. In addition to the lower glass transition temperature of the soft layer, the multilayer acoustic interlayers suitable for use may include interlayers have damping loss factors at 20° C. of at least 0.10, at least about 0.15, at least about 0.20 or more.

For multilayer glass panels, damping loss factor can be correlated generally with sound transmission loss at the coincident frequency, and as damping loss factor increases, sound transmission loss at the coincident frequency increases (see, for example, Lu, J: "Designing PVB Interlayer for Laminated Glass with Enhanced Sound Reduction", 2002, InterNoise 2002, paper 581; Lu, J. *"Windshields with New PVB Interlayer for Vehicle Interior Noise Reduction and Sound Quality Improvement"* 2003 *SAE Noise & Vibration Conference*, Traverse City, Mich., May 5-9, 2003, Society of Automotive Engineers Paper No. 2003-01-1587).

Examples of exemplary multilayer interlayer constructs include, but are not limited to, PVB//PVB//PVB, PVnB//PViB//PVnB, where the PVB (poly(vinyl butyral), PVnB (polyvinyl n-butyral) and/or PViB (poly(vinyl i-butyral) layer comprises a single resin or two or more resins having different residual hydroxyl contents or different polymer compositions; PVC//PVB//PVC, PVB//PVC//PVB, PVB// PU//PVB, PU//PVB//PU, Ionomed/PVB//Ionomer, Ionomer//PU//Ionomer, Ionomer//EVA//Ionomer, Ionomer//Ionomer//Ionomer, where the soft core layer (PVB (including PViB), PVC, PU, EVA or ionomer) comprises a single resin or two or more resins having different glass transition temperatures. Alternatively, the skin and core layers may all be PVB using the same or different starting resins. Other combinations of resins and polymers will be apparent to those skilled in the art. In general, as used herein "PVB" and "PVB resin" refer to PVnB or PViB or combinations of PVnB and PViB unless otherwise stated.

The soft core layer in a multilayer interlayer can contain one or more resins. When the core layer comprises at least one polyvinyl acetal resin, the resin, or at least one resin, in the soft core layer has at least one of the following characteristics: lower residual hydroxyl; higher residual vinyl acetate content; lower residual hydroxyl content and higher residual acetate content; different aldehyde from the stiff layers; mixed aldehydes; or a combination of any two or more properties. The soft layer typically contains at least one plasticizer, and in some embodiments, a mixture of two or more plasticizers, and in typical embodiments, the soft layer has a higher plasticizer content than the stiffer layer(s). Any combination of layer and interlayer properties may be used as desired and known to one of skill in the art.

Thermoplastic polymer resins may be formed by any suitable method. When the thermoplastic polymer resins include poly(vinyl acetal) resins, such resins may be formed by acetalization of poly(vinyl alcohol) with one or more aldehydes in the presence of a catalyst according to known methods such as, for example, those described in U.S. Pat. Nos. 2,282,057 and 2,282,026, as well as "Vinyl Acetal Polymers," in the *Encyclopedia of Polymer Science & Technology*, $3^{rd}$ ed., Volume 8, pages 381-399, by B. E. Wade (2003). The resulting poly(vinyl acetal) resins may include at least about 50, at least about 60, at least about 70, at least about 75, at least about 80, at least about 85, at least about 90 weight percent of residues of at least one aldehyde, measured according to ASTM D1396 as the percent acetalization of the resin. The total amount of aldehyde residues in a poly(vinyl acetal) resin can be collectively referred to as the acetal content, with the balance of the poly(vinyl acetal) resin being residual hydroxyl groups (as vinyl hydroxyl groups) and residual ester groups (as vinyl acetate groups), as discussed in further detail below.

Suitable poly(vinyl acetal) resins may include residues of any aldehyde and, in some embodiments, may include residues of at least one $C_4$ to $C_8$ aldehyde. Examples of suitable $C_4$ to $C_8$ aldehydes can include, for example, n-butyraldehyde, i-butyraldehyde, 2-methylvaleraldehyde, n-hexyl aldehyde, 2-ethylhexyl aldehyde, n-octyl aldehyde, and combinations thereof. One or more of the poly(vinyl acetal) resins utilized in the layers and interlayers described herein can include at least about 5, at least about 10, at least about 20, at least about 30, at least about 40, at least about 50, at least about 60, or at least about 70 weight percent of residues of at least one $C_4$ to $C_8$ aldehyde, based on the total weight of aldehyde residues of the resin. Alternatively, or in addition, the poly(vinyl acetal) resin may include not more than about 95, not more than about 90, not more than about 85, not more than about 80, not more than about 75, not more than about 70, or not more than about 65 weight percent of at least one $C_4$ to $C_8$ aldehyde. The $C_4$ to $C_8$ aldehyde may be selected from the group listed above, or it can be selected from the group consisting of n-butyraldehyde, i-butyraldehyde, 2-ethylhexyl aldehyde, and combinations thereof. In other embodiments, the poly(vinyl acetal)

resin may comprise residues of other aldehydes, including, but not limited to, cinnamaldehyde, hexylcinnamaldehyde, benzaldehyde, hydrocinnamaldehyde, 4-chlorobenzaldehyde, 4-t-butylphenylacetaldehyde, propionaldehyde, 2-phenylpropionaldehyde, and combinations thereof, alone or in combination with one or more of the $C_4$ to $C_8$ aldehydes described herein.

In various embodiments, the poly(vinyl acetal) resin may be a PVB resin that primarily comprises residues of n-butyraldehyde, and may, for example, include any desired amount of residues of an aldehyde other than n-butyraldehyde. Typically, the aldehyde residues other than n-butyraldehyde present in poly(vinyl butyral) resins may include i-butyraldehyde, 2-ethylhexyl aldehyde, and combinations thereof. When the poly(vinyl acetal) resin comprises a poly(vinyl butyral) resin, the weight average molecular weight of the resin can be at least about 30,000, at least about 50,000, at least about 80,000, at least about 100,000, at least about 130,000, at least about 150,000, at least about 175,000, at least about 200,000, at least about 300,000, or at least about 400,000 Daltons, measured by size exclusion chromatography using low angle laser light scattering (SEC/LALLS) method of Cotts and Ouano.

As previously described, poly(vinyl acetal) resins can be produced by hydrolyzing a poly(vinyl acetate) to poly(vinyl alcohol), and then acetalizing the poly(vinyl alcohol) with one or more of the above aldehydes to form a poly(vinyl acetal) resin. In the process of hydrolyzing the poly(vinyl acetate), not all the acetate groups are converted to hydroxyl groups, and, as a result, residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl groups) and residual acetate groups (as vinyl acetate groups) as part of the polymer chain. As used herein, the terms "residual hydroxyl content" and "residual acetate content" refer to the amount of hydroxyl and acetate groups, respectively, that remain on a resin after processing is complete. Both the residual hydroxyl content and the residual acetate content are expressed in weight percent, based on the weight of the polymer resin, and are measured according to ASTM D1396.

The poly(vinyl acetal) resins utilized in one or more polymer layers as described herein may have a residual hydroxyl content of at least about 6, at least about 7, at least about 8, at least about 9, at least about 10, at least about 11, at least about 12, at least about 13, at least about 14, at least about 15, at least about 16, at least about 17, at least about 18, at least about 18.5, at least about 19, at least about 20, at least about 21, at least about 22, at least about 23, at least about 24, at least about 25, at least about 26, at least about 27, at least about 28, at least about 29, at least about 30, at least about 31, at least about 32, or at least about 33 weight percent or more. Additionally, or in the alternative, the poly(vinyl acetal) resin or resins utilized in polymer layers of the present invention may have a residual hydroxyl content of not more than about 45, not more than about 43, not more than about 40, not more than about 37, not more than about 35, not more than about 34, not more than about 33, not more than about 32, not more than about 31, not more than about 30, not more than about 29, not more than about 28, not more than about 27, not more than about 26, not more than about 25, not more than about 24, not more than about 23, not more than about 22, not more than about 21, not more than about 20, not more than about 19, not more than about 18.5, not more than about 18, not more than about 17, not more than about 16, not more than about 15, not more than about 14, not more than about 13, not more than about 12, not more than about 11, or not more than about 10 weight percent.

In some embodiments, one or more polymer layers can include at least one poly(vinyl acetal) resin having a residual hydroxyl content of at least about 20, at least about 21, at least about 22, at least about 23, at least about 24, at least about 25, at least about 26, at least about 27, at least about 28, at least about 29, or at least about 30 weight percent and/or not more than about 45, not more than about 43, not more than about 40, not more than about 37, not more than about 35, not more than about 34, not more than about 33, or not more than about 32 weight percent. In some embodiments, one or more polymer layers can include at least one poly(vinyl acetal) resin having a residual hydroxyl content of at least about 6, at least about 7, at least about 8, at least about 9, at least about 10, at least about 11, or at least about 12 and/or not more than about 17, not more than about 16, not more than about 15, or not more than about 14 weight percent. When a polymer layer or interlayer includes more than one type of poly(vinyl acetal) resin, each of the poly(vinyl acetal) resins may have substantially the same residual hydroxyl contents, or one or more of the poly(vinyl acetal) resins may have a residual hydroxyl content substantially different from one or more other poly(vinyl acetal) resins.

One or more poly(vinyl acetal) resins used in interlayers according to the present invention may have a residual acetate content of not more than about 30, not more than about 25, not more than about 20, not more than about 18, not more than about 15, not more than about 12, not more than about 10, not more than about 8, not more than about 6, not more than about 4, not more than about 3, or not more than about 2 weight percent. Alternatively, or in addition, at least one poly(vinyl acetal) resin used in a polymer layer or interlayer as described herein can have a residual acetate content of at least about 3, at least about 4, at least about 5, at least about 6, at least about 7, at least about 8, at least about 9, at least about 10, at least about 12, or at least about 14 weight percent or more. When a polymer layer or interlayer includes two or more poly(vinyl acetal) resins, the resins may have substantially the same residual acetate content, or one or more resins may have a residual acetate content different from the residual acetate content of one or more other poly(vinyl acetal) resins.

The polymeric resin or resins utilized in polymer layers and multilayer acoustic interlayers as described herein may comprise one or more thermoplastic polymer resins. In some embodiments, the thermoplastic resin or resins may be present in the polymer layer in an amount of at least about 45, at least about 50, at least about 55, at least about 60, at least about 65, at least about 70, at least about 75, at least about 80, at least about 85, at least about 90, or at least about 95 weight percent, based on the total weight of the resins in the polymer layer. When two or more resins are present, each may be present in an amount of at least about 0.5, at least about 1, at least about 2, at least about 5, at least about 10, at least about 15, at least about 20, at least about 25, at least about 30, at least about 35, at least about 40, at least about 45, or at least about 50 weight percent, based on the total weight of the resins in the polymer layer or interlayer.

One or more polymer layers as described herein may also include at least one plasticizer. When present, the plasticizer content of one or more polymer layers can be at least about 2, at least about 5, at least about 6, at least about 8, at least about 10, at least about 15, at least about 20, at least about 25, at least about 30, at least about 35, at least about 40, at least about 45, at least about 50, at least about 55, at least about 60, at least about 65, at least about 70, at least about 75, or at least about 80 parts per hundred resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, not more than about 40, or not more than about 35 phr. In some embodiments, one or more polymer layers can have a plasticizer content of not more than 35, not more than about 32, not more than about 30, not more than about 27, not more than about 26, not more than about 25, not more than about 24, not more than about 23, not more than about 22, not more than about 21, not more than about 20, not more than about 19, not more than about 18, not more than about 17, not more than about 16, not more than about 15, not more than about 14, not more than about 13, not more than about 12, not more than about 11, or not more than about 10 phr.

As used herein, the term "parts per hundred resin" or "phr" refers to the amount of plasticizer present per one hundred parts of resin, on a weight basis. For example, if 30 grams of plasticizer were added to 100 grams of a resin, the plasticizer content would be 30 phr. If the polymer layer includes two or more resins, the weight of plasticizer is compared to the combined amount of all resins present to determine the parts per hundred resin. Further, when the plasticizer content of a layer or interlayer is provided herein, it is provided with reference to the amount of plasticizer in the mix or melt that was used to produce the layer or interlayer, unless otherwise specified.

For layers of unknown plasticizer content, the plasticizer content can be determined via a wet chemical method in which an appropriate solvent, or mixture of solvents, is used to extract the plasticizer from the polymer layer or interlayer. Prior to extracting the plasticizer, the weight of the sample layer is measured and compared with the weight of the layer from which the plasticizer has been removed after extraction. Based on this difference, the weight of plasticizer can be determined and the plasticizer content, in phr, calculated. For multiple layer interlayers, the polymer layers can be physically separated from one another and individually analyzed according to the above procedure.

Although not wishing to be bound by theory, it is understood that, for a given type of plasticizer, the compatibility of the plasticizer in the poly(vinyl acetal) resin may be correlated to the residual hydroxyl content of the resin. More particularly, poly(vinyl acetal) resins having higher residual hydroxyl contents may generally have a reduced plasticizer compatibility or capacity, while poly(vinyl acetal) resins with a lower residual hydroxyl content may exhibit an increased plasticizer compatibility or capacity. Generally, this correlation between the residual hydroxyl content of a polymer and its plasticizer compatibility/capacity can be manipulated in order to facilitate addition of the proper amount of plasticizer to the polymer resin and to stably maintain differences in plasticizer content between multiple layers within an interlayer. Similar correlation may also exist for the compatibility of the plasticizer and residual acetate content in the poly(vinyl acetal) resin.

Any suitable plasticizer can be used in the polymer layers described herein. The plasticizer may have a hydrocarbon segment of at least about 6 and/or not more than about 30, not more than about 25, not more than about 20, not more than about 15, not more than about 12, or not more than about 10 carbon atoms. In various embodiments, the plasticizer is selected from conventional plasticizers or a mixture of two or more conventional plasticizers. In some embodiments, the conventional plasticizer, which generally has refractive index of less than about 1.450, may include, triethylene glycol di-(2-ethylhexanoate) ("3GEH"), triethylene glycol di-(2-ethylbutyrate), tetraethylene glycol di-(2-ethylhexanoate) ("4GEH"), triethylene glycol diheptanoate, tetraethylene glycol diheptanoate, dihexyl adipate, dioctyl adipate, hexyl cyclohexyladipate, diisononyl adipate, heptylnonyl adipate, di(butoxyethyl) adipate, bis(2-(2-butoxyethoxy)ethyl) adipate, dibutyl sebacate, dioctyl sebacate, butyl ricinoleate, castor oil, triethyl glycol ester of coconut oil fatty acids, and oil modified sebacic alkyd resins. In some embodiments, the conventional plasticizer is 3GEH (Refractive index=1.442 at 25° C.).

In some embodiments, other plasticizers known to one skilled in the art may be used, such as a plasticizer with a higher refractive index (i.e., a high refractive index plasticizer). As used herein, a "high refractive index plasticizer" is a plasticizer having a refractive index of at least about 1.460. As used herein, the refractive index (also known as index of refraction) of a plasticizer or a resin is either measured in accordance with ASTM D542 at a wavelength of 589 nm and 25° C. or is reported in literature in accordance with ASTM D542. In various embodiments, the refractive index of the plasticizer is at least about 1.460, or greater than about 1.470, or greater than about 1.480, or greater than about 1.490, or greater than about 1.500, or greater than 1.510, or greater than 1.520, for both core and skin layers. In some embodiments, the high refractive index plasticizer(s) is used in conjunction with a conventional plasticizer(s), and in some embodiments, if included, the conventional plasticizer is 3GEH, and the refractive index of the plasticizer mixture is at least 1.460. Examples of suitable high refractive index plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, dibutoxy ethyl phthalate, diethyl phthalate, dibutyl phthalate, trioctyl phosphate, phenyl ethers of polyethylene oxide rosin derivatives, and tricresyl phosphate, and mixtures thereof. In some embodiments, the plasticizer may comprise, or consist of, a mixture of conventional and high refractive index plasticizers.

Additionally, at least one polymer layer may also include other types of additives that can impart particular properties or features to the polymer layer or interlayer. Such additives can include, but are not limited to, adhesion control agents ("ACAs"), dyes, pigments, stabilizers such as ultraviolet ("UV") stabilizers, antioxidants, anti-blocking agents, flame retardants, IR absorbers or blockers (such as indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives and fillers. Specific types and amounts of such additives may be selected based on the final properties or end use of a particular interlayer.

Depending on the polymer type and layer composition, the polymer layers described herein may exhibit a wide range of glass transition temperatures. In some embodiments, multilayer acoustic interlayers including two or more polymers or polymer layers can exhibit two or more glass transition temperatures. The glass transition temperature ($T_g$) of a polymeric material is the temperature that marks the transition of the material from a glassy state to a rubbery state. The glass transition temperatures of the polymer layers described herein were determined by dynamic mechanical thermal analysis (DMTA) according to the following procedure. A polymer sheet is molded into a sample disc of 25 millimeters (mm) in diameter. The polymer sample disc is placed between two 25-mm diameter parallel plate test fixtures of a Rheometrics Dynamic Spectrometer II. The polymer sample disc is tested in shear mode at an oscillation frequency of 1 Hertz as the temperature of the sample is increased from −20 to 70° C. or other temperature ranges at a rate of 2° C./minute. The position of the maximum value of tan delta ($G''/G'$) plotted as dependent on temperature is used to determine the glass transition temperature. Experience indicates that the method is reproducible to within +/−1° C.

Multilayer acoustic interlayers as described herein may include at least one polymer layer having a glass transition temperature of at least about −20, at least about −10, at least about −5, at least about −1, at least about 0, at least about 1, at least about 2, at least about 5, at least about 10, at least about 15, at least about 20, at least about 25, at least about 27, at least about 30, at least about 32, at least about 33, at least about 34, at least about 35, at least about 36, at least about 37, at least about 38, or at least about 40° C. Alternatively, or in addition, a polymer layer can have a glass transition temperature of not more than about 25, not more than about 20, not more than about 15, not more than about 10, not more than about 5, not more than about 2, not more than about 0, not more than about −1, or not more than about −5° C.

In some embodiments, one or more polymer layers may have a glass transition temperature of at least about 30, at least about 32, at least about 33, at least about 35, at least about 36, at least about 37, at least about 38, at least about 39, or at least about 40 and/or not more than about 100, not more than about 90, not more than about 80, not more than about 70, not more than about 60, not more than about 50, not more than about 45, not more than about 44, not more than about 43, not more than about 42, not more than about 41, not more than about 40, not more than about 39, not more than about 38, or not more than about 37° C. Alternatively, or in addition, at least one polymer layer may have a glass transition temperature of at least about −10, at least about −5, at least about −2, at least about −1, at least about 0, at least about 1, at least about 2, at least about 5 and/or not more than about 25, not more than about 20, not more than about 15, not more than about 10, not more than about 5, not more than about 2, not more than about 1, not more than about 0, or not more than about −1° C. When a multilayer acoustic interlayer includes two or more polymer layers, at least one of the layers may have a glass transition temperature different from one or more other polymer layers within the interlayer. Stated differently, when there are two or more layers, each layer may have a different glass transition temperature.

In some embodiments, a layer or interlayer according to the present invention may have a tan delta value at glass transition temperature of at least about 0.50, at least about 0.60, at least about 0.70, at least about 0.80, at least about 0.90, at least about 1.00, at least about 1.10, at least about 1.25, at least about 1.50, at least about 1.75, at least about 2.00, or at least about 2.25, as measured by DMTA.

In some embodiments, each (or all) of the polymer layers in an interlayer includes a poly(vinyl acetal) resin. In other embodiments, the multilayer acoustic interlayer may include a first polymer layer comprising a first poly(vinyl acetal) resin and a second poly(vinyl acetal) layer comprising a second poly(vinyl acetal) resin. The first and second polymer layers can be adjacent to one another or, optionally, may have one or more intervening polymer layers therebetween.

When present, the first and second (or more) poly(vinyl acetal) resins of respective first and second polymer layers can have different compositions. For example, in some embodiments, the first poly(vinyl acetal) resin can have a residual hydroxyl content that is at least about 2, at least about 3, at least about 4, at least about 5, at least about 6, at least about 7, at least about 8, at least about 9, at least about 10, at least about 12, at least about 13, at least about 14, at least about 15, at least about 16, at least about 17, at least about 18, at least about 19, at least about 20, at least about 21, at least about 22, at least about 23, or at least about 24 weight percent different than the residual hydroxyl content of the second poly(vinyl acetal) resin.

Additionally, or in the alternative, the first poly(vinyl acetal) resin can have a residual acetate content that is at least about 2, at least about 3, at least about 4, at least about 5, at least about 6, at least about 7, at least about 8, at least about 9, at least about 10, at least about 12, at least about 13, at least about 15, at least about 18, or at least about 20 weight percent different than the residual acetate content of the second poly(vinyl acetal) resin. In other embodiments, the first poly(vinyl acetal) resin can have a residual acetate content that is not more than about 2, not more than about 1.5, not more than about 1, or not more than about 0.5 weight percent different than the residual acetate content of the second poly(vinyl acetal) resin.

As used herein, the term "weight percent different" or "the difference . . . is at least . . . weight percent" refers to a difference between two given percentages, calculated by finding the absolute value of the mathematical difference between the two numbers. A value that is "different" from a given value can be higher or lower than the given value. For example, a first poly(vinyl acetal) resin having a residual hydroxyl content that is "at least 2 weight percent different than" the residual hydroxyl content of a second poly(vinyl acetal) resin may have a residual hydroxyl content that is at least 2 weight percent higher or at least 2 weight percent lower than the second residual hydroxyl content. For example, if the residual hydroxyl content of the exemplary second poly(vinyl acetal) resin is 14 weight percent, the residual hydroxyl content of the exemplary first poly(vinyl acetal) resin can be at least 16 weight percent (e.g., at least 2 weight percent higher) or not more than 12 weight percent (e.g., at least 2 weight percent lower).

As a result of having different compositions, the portions of the layer or interlayer formed from the different resins, such as the first poly(vinyl acetal) resin and the second poly(vinyl acetal) resin may have different properties, due to, for example, differences in plasticizer content. As described previously, when two poly(vinyl acetal) resins having different residual hydroxyl contents are blended with a plasticizer, the plasticizer will partition between the different resins, such that a higher amount of plasticizer is present in the layer(s) formed from the lower residual hydroxyl content resin and less plasticizer is present in the portion of the layer(s) including the higher residual hydroxyl content resin. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more layers when the plasticizer would otherwise migrate from one layer to the other layer.

When the poly(vinyl acetal) resins have different residual hydroxyl contents and/or have different residual acetate contents, the polymer layers may also include different amounts of plasticizer. As a result, each of these portions may also exhibit different properties, such as, for example, glass transition temperature. In some embodiments, the difference in plasticizer content between adjacent polymer layers can be at least about 2, at least about 5, at least about 8, at least about 10, at least about 12, or at least about 15 phr, measured as described above. In other embodiments, the difference in plasticizer content between adjacent polymer layers can be at least about 18, at least about 20, at least about 25, at least about 30, at least about 35, at least about 40, at least about 45, at least about 50, at least about 55, at least about 60, or at least about 65 phr.

In addition, or in the alternative, the difference between the plasticizer content of adjacent polymer layers may be not more than about 40, not more than about 35, not more than about 30, not more than about 25, not more than about 20, not more than about 17, not more than about 15 or not more than about 12 phr. The values for the plasticizer content of each of the polymer layers may fall within one or more of the ranges provided above.

In some embodiments, the glass transition temperature of one polymer layer can be at least about 3, at least about 5, at least about 8, at least about 10, at least about 12, at least about 13, at least about 15, at least about 18, at least about 20, at least about 22, at least about 25, at least about 30, at least about 35, or at least about 40° C. different than the glass transition temperature of another polymer layer. The values for the glass transition temperatures of each of the polymer layers may fall within one or more of the ranges provided above.

When the multiple layer interlayer includes three or more polymer layers, each of the respective first, second, and third (or more) polymer layers can include at least one poly(vinyl acetal) resin and an optional plasticizer(s) of the types and in the amounts described in detail previously. According to some embodiments, the second (inner) polymer layer can include a resin having a residual hydroxyl content lower than the residual hydroxyl contents of the poly(vinyl acetal) resins in each of the first and third (outer) polymer layers. Consequently, as the plasticizer partitions between the layers, the inner layer may have a glass transition temperature lower than the glass transition temperature of each of the outer polymer layers. Although not wishing to be bound by theory, it is understood that this type of configuration, wherein relatively "stiff" (i.e., higher glass transition temperature) outer polymer layers are sandwiching a "soft" (i.e., relatively low glass transition temperature) inner layer, may facilitate enhanced acoustic performance from the interlayer. Other embodiments having additional layers and/or configurations are also possible, such as interlayers having four, five, six, seven or more layers.

In some embodiments, two (or more) layers, such as the outer polymer layers, can have the same or similar compositions and/or properties. For example, in some embodiments, the poly(vinyl acetal) resin in one polymer layer can have a residual hydroxyl content within about 2, within about 1, or within about 0.5 weight percent of the residual hydroxyl content of the poly(vinyl acetal) resin in another polymer layer. Similarly, the poly(vinyl acetal) resins in the outer layers can have residual acetate contents within about 2, within about 1, or within about 0.5 weight percent of one another. Additionally, the outer polymer layers may have the same or similar plasticizer contents and/or may exhibit the same or similar glass transition temperatures. For example, the plasticizer content of one polymer layer can be less than 2, not more than about 1, or not more than about 0.5 phr different than the plasticizer content of another polymer layer, and/or the polymer layers can have glass transition temperatures that differ by less than 2, not more than about 1, or not more than about 0.5° C.

In various embodiments, the differences in residual hydroxyl and/or residual acetate content of the poly(vinyl acetal) resins can be selected to control or provide certain performance properties, such as strength, impact resistance, penetration resistance, processability, or acoustic performance to the final composition, layer, or interlayer. For example, poly(vinyl acetal) resins having a higher residual hydroxyl content, usually greater than about 17 weight percent, can facilitate high impact resistance, penetration resistance, and strength to a resin composition or layer, while lower hydroxyl content resins, usually having a residual hydroxyl content of less than 17 weight percent, can improve the acoustic performance of the interlayer.

The interlayers of the present invention can be formed according to any suitable method. Exemplary methods can include, but are not limited to, solution casting, compression molding, injection molding, melt extrusion, melt blowing, and combinations thereof. Multilayer interlayers including two or more polymer layers may also be produced according to any suitable method such as, for example, co-extrusion, blown film, melt blowing, dip coating, solution coating, blade, paddle, air-knife, printing, powder coating, spray coating, lamination, and combinations thereof.

According to various embodiments of the present invention, the layers or interlayers may be formed by extrusion or co-extrusion. In an extrusion process, one or more thermoplastic resins, plasticizers, and, optionally, one or more additives as described previously, can be pre-mixed and fed into an extrusion device(s). The extrusion device(s) is configured to impart a particular profile shape to the thermoplastic composition in order to create an extruded sheet. The extruded sheet, which is at an elevated temperature and highly viscous throughout, can then be cooled to form a polymeric sheet. Once the sheet has been cooled and set, it may be cut and rolled for subsequent storage, transportation, and/or use as an interlayer.

Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

According to some embodiments, multiple layer panels of the present invention exhibit desirable acoustic properties, as indicated by, for example, the reduction in the transmission of sound as it passes through (i.e., the sound transmission loss of) the interlayer. In some embodiments, multiple layer panels of the present invention may exhibit a sound transmission loss at the coincident frequency, measured according to ASTM E90 at 20° C. and panel dimensions of 50 cm by 80 cm, of at least about 34, at least about 35, at least about 36, at least about 37, at least about 38, at least about 39, at least about 40, at least about 41, or at least about 42 dB.

Additionally, the layers and interlayers can have a damping loss factor, or loss factor, of at least about 0.10, at least about 0.12, at least about 0.15, at least about 0.17, at least about 0.20, at least about 0.25, at least about 0.27, at least about 0.30, at least about 0.33, at least about 0.35, at least about 0.40, or at least about 0.45 at 20° C. Loss factor is measured by Mechanical Impedance Measurement as described in ISO Standard 16940. To measure damping loss factor, a polymer sample is laminated between two sheets of clear glass, each having a thickness of 2.3 mm or other glass thicknesses as desired, and is prepared to have a width of 25 mm and a length of 300 mm. The laminated sample is then excited at the center point using a vibration shaker (commercially available from Brüel and Kjær (Nærum, Netherlands)) and an impedance head (Brüel and Kjær) is used to measure the force required to excite the bar to vibrate and the velocity of the vibration. The resultant transfer function is recorded on a National Instrument data acquisition and analysis system and the loss factor at the first vibration mode is calculated using the half power method.

Multiple layer panels as described herein may be formed by any suitable method. The typical glass lamination process comprises the following steps: (1) assembly of the two (or more) substrates and the interlayers; (2) heating the assembly via an IR radiant or convective device for a first, short period of time; (3) passing the assembly into a pressure nip roll for the first de-airing; (4) heating the assembly for a short period of time to an appropriate temperature (such as about 60° C. to about 120° C.) to give the assembly enough temporary adhesion to seal the edge of the interlayer; (5) passing the assembly into a second pressure nip roll to further seal the edge of the interlayer and allow further handling; and (6) autoclaving the assembly at an appropriate temperature (such as between 135° C. and 150° C.) and appropriate pressure (such as between 150 psig and 200 psig) for about 30 to 90 minutes. Other methods for de-airing the interlayer-glass interface, as described according to one embodiment in steps (2) through (5) above include vacuum bag and vacuum ring processes, and both may also be used to form interlayers of the present invention as described herein.

The multiple layer panels of the present invention can be used for a variety of end use applications, including, for example, for automotive windshields and windows, aircraft windshields and windows, panels for various transportation applications such as marine applications, rail applications, etc., structural architectural panels such as windows, doors, stairs, walkways, balusters, decorative architectural panels, weather-resistant panels, such as hurricane glass or tornado glass, ballistic panels, and other similar applications.

The following examples are intended to be illustrative of the present invention in order to teach one of ordinary skill in the art to make and use the invention and are not intended to limit the scope of the invention in any way.

The invention also includes Embodiments 1 to 15, below.

Embodiment 1 is a sound insulating multiple layer panel comprising: a first rigid substrate having a first thickness $H_3$, a second rigid substrate having a second thickness $H_1$, wherein $H_3 \leq H_1$, and a multiple layer acoustic interlayer having a thickness $H_2$ between the first and second rigid substrates, wherein the multiple layer interlayer comprises a first stiff layer having a stiff layer thickness, a second stiff layer having a second stiff layer thickness, and a soft layer between the first and second stiff layers, and wherein the multiple layer panel has an interlayer thickness factor, $I_{ft}$, of at least 0.80, wherein $I_f=(H_2-0.84)\div[(H_1+H_3)(H_1+H_2+H_3)]\times 100$.

Embodiment 2 is a multiple layer panel including the features of Embodiment 1, wherein the soft layer of the multiple layer interlayer is non-centrally located.

Embodiment 3 is an asymmetric sound insulating multiple layer panel comprising: a first rigid substrate having a first thickness $H_3$, a second rigid substrate having a second thickness $H_1$, wherein $H_3<H_1$, and a multiple layer acoustic interlayer having a thickness $H_2$ between the first and second rigid substrates, wherein the multiple layer interlayer comprises a first stiff layer having a stiff layer thickness, a second stiff layer having a second stiff layer thickness, and a soft layer between the first and second stiff layers, wherein the soft layer is non-centrally positioned in the interlayer, and wherein the multiple layer panel has an interlayer thickness factor, $I_{ft}$, of at least 0.80, wherein $I_f=(H_2-0.84)\div[(H_1+H_3)(H_1+H_2+H_3)]\times 100$.

Embodiment 4 is a multiple layer panel including any of the features of Embodiments 1 to 3, wherein the multiple layer panel has an interlayer thickness factor, $I_{ft}$, of at least 0.90.

Embodiment 5 is a multiple layer panel including any of the features of Embodiments 1 to 4, wherein $H_3<H_1$.

Embodiment 6 is a multiple layer panel including any of the features of Embodiments 1 to 4, wherein $H_3=H_1$.

Embodiment 7 is a multiple layer panel including any of the features of Embodiments 1 to 6, wherein the ratio of $H_3$ to $H_1$ is from 0.23 to 0.95.

Embodiment 8 is a multiple layer panel including any of the features of Embodiments 1 to 7, wherein the interlayer further comprises a third stiff layer and a second soft layer, wherein the second soft layer is positioned between the second stiff layer and the third stiff layer.

Embodiment 9 is a multiple layer panel including the features of Embodiment 8, wherein the first stiff layer thickness is less than the second stiff layer thickness and the second soft layer is non-centrally located.

Embodiment 10 is a multiple layer panel including any of the features of Embodiments 1 to 9, wherein the glass transition temperature of the soft layer is less than 20° C.

Embodiment 11 is a multiple layer panel including any of the features of Embodiments 1 to 10, wherein the soft layer has a geometric center location, and wherein the interlayer has a first thickness $t_1$ that is the thickness from the geometric center location to an outer surface of the first stiff layer, and a second thickness $t_2$ that is the thickness from the geometric center location to an outer surface of the second stiff layer, wherein the ratio of $t_2$ to $t_1$ is less than 1.

Embodiment 12 is a method for increasing the surface density of a multiple layer panel to improve the sound transmission loss at the coincident frequency region of the panel, the method comprising the steps of: providing a first rigid substrate having a thickness of $H_3$; providing a second rigid substrate having a thicknesses of $H_1$; providing a multiple layer interlayer having a thickness of $H_2$, determining the interlayer thickness factor, $I_f$ of the multiple layer panel according to the equation: $I_f=(H_2-0.84)\div[(H_1+H_3)(H_1+H_2+H_3)]\times100$; increasing the interlayer thickness factor $I_f$ of the panel to at least 0.80; placing the interlayer between the first rigid substrate and the second rigid substrate to provide a pre-laminate; and subjecting the pre-laminate to heat and pressure to form a multiple layer panel having improved sound transmission loss.

Embodiment 13 is a method for increasing the surface density of a multiple layer panel including the features of Embodiment 12, wherein $H_3<H_1$.

Embodiment 14 is a method for increasing the surface density of a multiple layer panel including any of the features of Embodiments 12 and 13, wherein the interlayer comprises a first stiff layer having a stiff layer thickness, a second stiff layer having a second stiff layer thickness, and a soft layer between the first and second stiff layers, wherein the soft layer is non-centrally positioned in the interlayer.

Embodiment 15 is a method for increasing the surface density of a multiple layer panel including any of the features of Embodiments 12 to 14, wherein the interlayer further comprises a third stiff layer and a second soft layer, wherein the second soft layer is positioned between the second stiff layer and the third stiff layer.

EXAMPLES

The following Examples describe the preparation of multiple layer glass panels and interlayers. As described below, several tests performed on the glass panels were used to evaluate the acoustic properties of several comparative and disclosed multiple layer glass panels.

Monolithic and multilayer (tri-layer) PVB sheets were produced by the following methods. Several monolithic sheets were formed by melt blending PVB resin with plasticizer(s) (types and amounts shown in Table 1). The resulting plasticized resins were each extruded to form polymer sheets. Several three-layer (or tri-layer) sheets were also formed by coextruding a first PVB resin and a second PVB resin, each of which had been melt blended with plasticizer(s) (types and amounts shown in Table 1). The resulting multiple layer interlayers included two outer skin layers formed from one PVB resin with an inner core layer formed from the other PVB resin between the two outer layers. Table 1 summarizes the PVB sheet compositions for PVB-1 to PVB-8 and shows the individual layers (for multilayer sheets) and thicknesses. PVB-2, PVB-3, PVB-5, and PVB-6 are symmetrically configured acoustic multilayer PVB sheets having skin/core/skin (or stiff/soft/stiff) layer configurations (the core or soft layer is located at the center position of the sheet). PVB-1, PVB-4, PVB-7 and PVB-8 are monolithic PVB sheets. The PVB sheets, alone or in combination, were used to construct various multilayer glass panels in Examples 1 to 3 described below. Results are shown in Tables 2 to Table 4 below.

TABLE 1

Acoustic (Stiff/Soft/Stiff) Tri-layer Sheet and Monolithic Sheet Compositions

| | Sheet No. | | | | | | | |
|---|---|---|---|---|---|---|---|---|
| | PVB-1 | PVB-2 | PVB-3 | PVB-4 | PVB-5 | PVB-6 | PVB-7 | PVB-8 |
| Skin layer resin residual hydroxyl content (wt. %) | 18.5 | 18.5 | 24 | 18.5 | 18.5 | 22 | 22 | 22 |
| Skin layer 3GEH PZ content (phr) | 38 | 38 | — | 38 | 38 | 28 | 28 | 28 |
| Skin layer B9-88/3GEH (60/40) PZ content (phr) | — | — | 36 | — | — | — | — | — |
| Core layer resin residual hydroxyl content (wt. %) | — | 10.5 | 9 | — | 10.5 | 9 | — | — |
| Core layer 3GEH PZ content (phr) | — | 75 | — | — | 75 | 70 | — | — |
| Core layer B9-88/3GEH (60/40) PZ content (phr) | — | — | 80 | — | — | — | — | — |
| Core layer thickness (mm) | — | 0.11 | 0.11 | — | 0.089 | 0.11 | — | — |
| Sheet thickness ($H_2$, mm) | 0.76 | 0.84 | 0.84 | 0.38 | 0.50 | 0.84 | 0.38 | 0.76 |
| Skin layer glass transition temperature (° C.) | 30 | 30 | 41 | 30 | 30 | 42 | 42 | 42 |
| Symmetry of soft layer ($S_I = t_2/t_1$) | — | 1 | 1 | — | 1 | 1 | — | — |
| Core layer glass transition temperature (° C.) | — | -2 | -2 | — | -2 | -2 | — | — |

PZ: Plasticizer (3GEH is triethylene glycol di-(2-ethylhexanoate) and B9-88 is Benzoflex™ 9-88 plasticizer)

Example 1: Increasing Surface Density by Increasing Glass Thickness

Comparative multilayer glass panels C-LG1 to C-LG7 of varying symmetry of glass ($S_G$) levels from 0.23 to 1 were produced by laminating an acoustic PVB sheet (PVB-2, symmetry of core=1) between two clear glass panel pairs (500 mm×800 mm) of varying thicknesses, as shown in Table 2 below. The sound transmission loss of each of the comparative multilayer glass panels was measured (according to the procedure described by ASTM E90 at 20° C.) for various frequencies over a range of 200 Hz to 10,000 Hz. The damping loss factor (η) was measured on a 25 mm×300 mm laminated bar at 20° C. by Mechanical Impedance Measurement as described in ISO 16940. Coincident frequency and sound transmission loss at coincident frequency from STL measurement are summarized in Table 2. Plots in the 315 to 8000 Hz third-octave band frequency region for C-LG1, C-LG2, C-LG3 and C-LG4 are shown in FIG. 3.

TABLE 2

Glass Panel Constructions and Sound Insulation Properties

| | Laminated glass panel | | | | | | |
|---|---|---|---|---|---|---|---|
| | C-LG1 | C-LG2 | C-LG3 | C-LG4 | C-LG5 | C-LG6 | C-LG7 |
| Interlayer | PVB-2 | PVB-2 | PVB-2 | PVB-2 | PVB-2 | PVB-2 | PVB-2 |
| Interlayer thickness ($H_2$, mm) | 0.84 | 0.84 | 0.84 | 0.84 | 0.84 | 0.84 | 0.84 |
| Symmetry of soft layer ($S_I = t_2/t_1$) | 1 | 1 | 1 | 1 | 1 | 1 | 1 |
| Glass configuration ($H_3/H_1$, mm/mm) | 2.1/1.6 | 1.85/1.85 | 2.1/2.1 | 2.3/2.3 | 1.6/0.7 | 2.1/0.7 | 3.0/0.7 |
| Combined glass thickness (mm) | 3.7 | 3.7 | 4.2 | 4.6 | 2.3 | 2.8 | 3.7 |
| Symmetry of glass ($S_G = H_3/H_1$) | 0.76 | 1 | 1 | 1 | 0.44 | 0.33 | 0.23 |
| Surface density (kg/m²) | 10.1 | 10.1 | 11.4 | 12.4 | 6.6 | 7.9 | 10.1 |
| Interlayer thickness factor ($I_f$) | 0 | 0 | 0 | 0 | 0 | 0 | 0 |
| Damping loss factor at 20° C. | 0.28 | 0.3 | 0.31 | 0.31 | — | — | — |
| Coincident frequency (Hz) | 5000-6300 | 5000-6300 | 5000 | 5000 | 8000 | 6300 | 5000 |
| TL at coincident frequency (dB) | 38.1 | 38.4 | 38.2 | 38.3 | 38.1 | 36.7 | 35.6 |

As shown in Table 2, all glass panels contain the same acoustic tri-layer interlayer (PVB-2, symmetry of core layer of 1). The glass panels also have an interlayer thickness factor ($I_f$) of 0. The combined glass thickness varied from 2.3 to 4.6 mm. Glass panels C-LG1 through C-LG4 have increasing combined glass thickness and surface density. FIG. 3 shows that increasing surface density of a panel increases its sound transmission loss in the mass controlled frequency region and frequency region above the coincident frequency (stiffness controlled region). However, as shown by a comparison of glass panels C-LG1 to C-LG4, the sound transmission loss at the coincident frequency of the highly symmetric panels appears to be independent of glass thickness. For example, panel C-LG1 has a symmetry of glass of 0.76, and panels C-LG2 to C-LG4 have a symmetry of glass of 1 (a difference of 0.24), but the panels have combined glass thicknesses of 3.7 mm (C-LG1 and C-LG2), 4.2 mm (C-LG3), and 4.6 mm (C-LG4). Increasing the thickness of individual glass sheets in panel C-LG1 (asymmetric configuration of 2.1 mm/1.6 mm) or panel C-LG2 (symmetric configuration of 1.85 mm/1.85 mm) to the symmetric configurations 2.1 mm/2.1 mm (C-LG3) or 2.3 mm/2.3 mm (C-LG4) resulted in increased surface densities of the panels from 10.1 kg/m² (C-LG1 and C-LG2) to 11.4 kg/m² (C-LG3) and 12.4 kg/m² (C-LG4). Despite the differences in combined glass thickness or surface density, and a small difference in the symmetry of glass between panel C-LG1 and panels C-LG2 to C-LG4, all of the glass panels exhibited a similar sound transmission loss of 38.1 to 38.4 dB at the coincident frequency, which is consistent with the high damping loss factors of these panels (0.28 to 0.31). In addition, there is a small drop in sound transmission loss between the frequencies 3150 Hz to 5000 Hz as the combined glass thickness is increased. Thus, adjusting the combined glass thickness alone to increase the surface density does not appear to sufficiently alter the sound transmission loss of the panels at the coincident frequency region.

Glass panels C-LG5 through C-LG7 have different symmetries of glass and combined glass thicknesses (C-LG5: 2.3 mm, $S_G$=0.44, C-LG6: 2.8 mm, $S_G$=0.33, and C-LG7: 3.7 mm, $S_G$=0.23). The interlayer thickness factor of the panels is 0. Increasing the thickness of one of the glass sheets in panels C-LG5 (1.6 mm/0.7 mm) to C-LG6 (2.1 mm/0.7 mm) and C-LG7 (3 mm/0.7 mm) resulted in increased surface density of the panels, ranging from 6.6 kg/m² for C-LG5 to 7.9 kg/m² for C-LG6 and 10.1 kg/m² for C-LG7, and reduced the symmetry of glass from 0.44 to 0.33 and 0.23 (an overall reduction of 0.21).

FIG. 4 plots sound transmission loss for panels C-LG5, C-LG6, and C-LG7 in the frequency range of 315 to 10000 Hz. Similar to the results exhibited by panels C-LG1 to C-LG4, the panels having lower symmetry of glass values (C-LG5 to C-LG7) also show mass or surface density dependent sound transmission loss in the frequency range from 315 Hz to 2500 Hz. Unlike glass panels C-LG1 to C-LG4, which show little change in sound transmission loss at the coincident frequency when the combined glass thickness is increased or reduced, panels C-LG5 to C-LG7 exhibit sound transmission loss at the coincident frequency that appears to be dependent on the symmetry of glass. Of panels C-LG5, C-LG6, and C-LG7, panel C-LG7 has the highest surface density but the lowest symmetry of glass (0.23), and it exhibited STL of 34.1 dB at the coincident frequency. Panel C-LG5 has the lowest surface density but the highest symmetry of glass (0.44) and it exhibited STL of 36.7 dB at the coincident frequency. Finally, panel C-LG6 has a surface density and symmetry of glass (0.33), between panels C-LG5 and C-LG7, and it exhibited STL of 35.6 dB. The largest difference between the symmetry of glass values among these three panels is 0.21, similar to the difference between panel C-LG1 and panels C-LG2 to C-LG4. In addition, panel C-LG7 exhibited an overall lower STL than panels C-LG5 and C-LG6 in the frequency range from 3150 to 5000 Hz, even though panel C-LG7 had higher STL at the mass controlled region. From these results, it can be seen that adjusting the combined glass thickness alone to increase the surface density in a highly asymmetric laminated glass panel can reduce the STL at about the coincident frequency region, as shown in FIG. 4. While increasing the surface density of an acoustic glass panel by increasing the combined glass thickness increases STL loss at the mass controlled region, generally below 2000 to 2500 Hz, the STL at the coincident frequency region is not increased as the combined glass thickness is increased.

Example 2: Increasing Surface Density by Increasing Interlayer Thickness Factor

Disclosed and additional comparative multilayer glass panels were produced by laminating PVB sheets (alone or in combination) between two sheets of glass of varying symmetries at a constant combined glass thickness level. The interlayers had varying symmetry of core layer values, as shown in Table 3. For example, comparative panels C-LG8 and C-LG9 had symmetric glass configurations ($S_G$=1) and symmetric interlayers ($S_I$=1) (using PVB-5 and PVB-6 respectively), and were produced by laminating the PVB sheet with two 2.1 mm glass sheets. Disclosed panels D-LG1, D-LG3, and D-LG4 also had symmetric glass configurations ($S_G=1$) and symmetric interlayers ($S_I=1$), but the interlayers were produced by combining multiple PVB sheets for form tri-layer sheets (for D-LG1, PVB-5 was combined with one PVB-4 sheet on each side; for D-LG4, PVB-5 was combined with one PVB-1 sheet on each side; for D-LG3, PVB-6 was combined with one PVB-7 on each side). Comparative panels C-LG11 and C-LG12 had asymmetric glass configurations ($S_G=0.42$) and symmetric interlayers ($S_I=1$) and were produced by laminating the PVB sheet between 3 mm and 1.25 mm glass sheets to form the multilayer glass panels. Disclosed panels D-LG14 and D-LG15 also had asymmetric glass configurations ($S_G=0.42$) and symmetric interlayers ($S_I=1$), but the interlayers were produced by combining multiple PVB sheets to form tri-layer sheets (for D-LG14, PVB-5 was combined with one PVB-4 sheet on each side; and for D-LG15, PVB-5 was combined with one PVB-1 sheet on each side).

To produce interlayers having different (reduced) symmetry of core layer values, either PVB-5 or PVB-6 was laminated with one or more PVB sheets of different composition and thickness, as shown in Table 3, to create asymmetric interlayers. The asymmetric interlayers were then used to produce disclosed panels D-LG2, D-LG5, D-LG9, D-LG10, D-LG12, D-LG13, and D-LG16 to D-LG21. For example, combining one sheet of PVB-5 with one or two sheets of PVB-1 and PVB-4 created asymmetrical interlayers shown in disclosed glass panels D-LG2, D-LG5, D-LG9, D-LG10, D-LG13, D-LG16, D-LG17, D-LG20, and D-LG21; and combining one sheet of PVB-6 with one sheet of PVB-8 created asymmetrical interlayers shown in D-LG18 and D-LG19. The symmetry of the core layer was determined as previously described using equation 3. Combining two or more PVB sheets (of Table 1) to create the interlayers shown in Table 3 increased the thickness of the interlayers as well as the interlayer thickness factor of the glass panel.

Interlayers having multiple symmetries of core layer values were created by laminating two or more tri-layer sheets having symmetric or asymmetric core layers, as shown in Table 3. For example, Interlayers PVB-3/PVB-3 and PVB-3/PVB-3/PVB-3 (interlayers used in panels D-LG6 and D-LG7 or D-LG22 and D-LG23 respectively) were produced by laminating two and three sheets of PVB-3 together to form a multiple layer interlayer with more than one symmetry of core layer. (Note that the interlayers with both the symmetric and asymmetric core layers could also be produced through co-extrusion instead of laminating multiple sheets together to form the interlayers.) The resulting panels were tested for damping loss factor as previously described, and test results and details of the panels are summarized in Table 3, below.

TABLE 3

Comparative and Disclosed Glass Panel Constructions and Sound Insulation Properties

| Glass panel | Interlayer | Interlayer thickness ($H_2$, mm) | Symmetry of soft layer ($S_I = t_2/t_1$) | Glass configuration (mm/mm) | Combined glass thickness (mm) | Symmetry of glass ($S_G = H_3/H_1$) | Surface density (kg/m²) | Interlayer thickness factor ($I_f$) | Damping loss factor at 20° C. |
|---|---|---|---|---|---|---|---|---|---|
| C-LG8 | PVB-5 | 0.5 | 1 | 2.1/2.1 | 4.2 | 1 | 11.0 | 0 | 0.26 |
| C-LG9 | PVB-6 | 0.84 | 1 | 2.1/2.1 | 4.2 | 1 | 11.4 | 0 | 0.27 |
| D-LG1 | PVB-4/PVB-5/PVB-4 | 1.26 | 1 | 2.1/2.1 | 4.2 | 1 | 11.8 | 1.8 | 0.28 |
| D-LG2 | PVB-1/PVB-5 | 1.26 | 0.25 | 2.1/2.1 | 4.2 | 1 | 11.8 | 1.8 | 0.29 |
| D-LG3 | PVB-7/PVB-6/PVB-7 | 1.6 | 1 | 2.1/2.1 | 4.2 | 1 | 12.2 | 3.1 | 0.29 |
| D-LG4 | PVB-1/PVB-5/PVB-1 | 2.03 | 1 | 2.1/2.1 | 4.2 | 1 | 12.7 | 4.6 | 0.30 |
| D-LG5 | PVB-1/PVB-1/PVB-5 | 2.03 | 0.14 | 2.1/2.1 | 4.2 | 1 | 12.7 | 4.6 | 0.32 |
| D-LG6 | PVB-3/PVB-3 | 1.68 | 0.33; 0.33 | 2.1/2.1 | 4.2 | 1 | 12.3 | 3.4 | 0.42 |
| D-LG7 | PVB-3/PVB-3/PVB-3 | 2.52 | 0.2; 1; 0.2 | 2.1/2.1 | 4.2 | 1 | 13.2 | 6 | 0.49 |
| C-LG10 | PVB-5 | 0.5 | 1 | 2.3/1.9 | 4.2 | 0.83 | 11.0 | 0 | 0.26 |
| D-LG8 | PVB-4/PVB-5/PVB-4 | 1.26 | 1 | 2.3/1.9 | 4.2 | 0.83 | 11.8 | 1.8 | 0.28 |
| D-LG9 | PVB-5/PVB-1 | 1.26 | 0.25 | 2.3/1.9 | 4.2 | 0.83 | 11.8 | 1.8 | 0.29 |
| D-LG10 | PVB-1/PVB-5 | 1.26 | 0.25 | 2.3/1.9 | 4.2 | 0.83 | 11.8 | 1.8 | 0.29 |
| D-LG11 | PVB-1/PVB-5/PVB-1 | 2.03 | 1 | 2.3/1.9 | 4.2 | 0.83 | 12.7 | 4.6 | 0.29 |
| D-LG12 | PVB-1/PVB-1/PVB-5 | 2.03 | 0.14 | 2.3/1.9 | 4.2 | 0.83 | 12.7 | 4.6 | 0.29 |
| D-LG13 | PVB-5/PVB-1/PVB-1 | 2.03 | 0.14 | 2.3/1.9 | 4.2 | 0.83 | 12.7 | 4.6 | 0.30 |
| C-LG11 | PVB-5 | 0.5 | 1 | 3/1.25 | 4.2 | 0.42 | 11.0 | 0 | 0.20 |
| C-LG12 | PVB-6 | 0.84 | 1 | 3/1.25 | 4.2 | 0.42 | 11.4 | 0 | 0.21 |
| D-LG14 | PVB-4/PVB-5/PVB-4 | 1.26 | 1 | 3/1.25 | 4.2 | 0.42 | 11.8 | 1.8 | 0.21 |
| D-LG15 | PVB-1/PVB-5/PVB-1 | 2.03 | 1 | 3/1.25 | 4.2 | 0.42 | 12.7 | 4.6 | 0.22 |
| D-LG16 | PVB-1/PVB-5 | 1.26 | 0.25 | 3/1.25 | 4.2 | 0.42 | 11.8 | 1.8 | 0.23 |
| D-LG17 | PVB-5/PVB-1 | 1.26 | 0.25 | 3/1.25 | 4.2 | 0.42 | 11.8 | 1.8 | 0.24 |
| D-LG18 | PVB-8/PVB-6 | 1.6 | 0.35 | 3/1.25 | 4.2 | 0.42 | 12.2 | 3.1 | 0.26 |
| D-LG19 | PVB-6/PVB-8 | 1.6 | 0.35 | 3/1.25 | 4.2 | 0.42 | 12.2 | 3.1 | 0.25 |
| D-LG20 | PVB-1/PVB-1/PVB-5 | 2.03 | 0.14 | 3/1.25 | 4.2 | 0.42 | 12.7 | 4.6 | 0.26 |
| D-LG21 | PVB-5/PVB-1/PVB-1 | 2.03 | 0.14 | 3/1.25 | 4.2 | 0.42 | 12.7 | 4.6 | 0.25 |
| D-LG22 | PVB-3/PVB-3 | 1.68 | 0.33; 0.33 | 3/1.25 | 4.2 | 0.42 | 12.3 | 3.4 | 0.33 |
| D-LG23 | PVB-3/PVB-3/PVB-3 | 2.52 | 0.2; 1; 0.2 | 3/1.25 | 4.2 | 0.42 | 13.2 | 6 | 0.40 |

As shown in Table 3, glass panels C-LG8, C-LG9, and D-LG1 to D-LG5 all have 2.1 mm/2.1 mm glass configurations (combined glass thickness of 4.2 mm and the symmetry of glass of 1), but the panels have increasing surface density from 11.0 to 12.7 kg/m² as the interlayer thickness factor in these panels is increased from 0 to 4.6. The symmetry of core layer varies from 1 to 0.14 as the core layer is either centrally or non-centrally located in the interlayer. Comparative glass panels C-LG8 and C-LG9 (having an interlayer thickness factor of 0) exhibited damping loss factors of 0.26 and 0.27, respectively, with PVB-5 and PVB-6. Disclosed glass panels D-LG1 to D-LG5 exhibited damping loss factors higher than comparative panels C-LG7 and C-LG8, and the damping loss factors trended higher as the interlayer thickness factor increased. Improvements of up to 0.06 in loss factor were achieved when the interlayer thickness factor was increased from 0 to 4.6, regardless of the symmetry of the core layer in the interlayer.

As shown in Table 3, disclosed panel D-LG6 contains two core layers in the interlayer with the symmetry of core layers each at 0.33, and disclosed panel D-LG7 contains three core layers in the interlayer with two asymmetric core layers (0.2, 0.2) and one symmetric core layer. Both panels were made with 2.1 mm/2.1 mm glass sheets, and the interlayer thickness factors were 3.4 and 6, respectively. Panels D-LG6 and D-LG7 exhibited loss factors of 0.42 and 0.49, substantially higher than the panels having only one core layer (C-LG8, C-LG9, and D-LG1 to D-LG5). The presence of multiple core layers in D-LG6 and D-LG7 combined with a higher interlayer thickness factor provided additional damping layers and subsequently increased the loss factors of the panels.

Disclosed panels D-LG1 through D-LG7 demonstrate that damping loss factor or sound insulation of a symmetric glass panel can be increased by increasing the surface density through increased interlayer thickness factor. It is not possible to achieve the improved damping loss factor and sound insulation by only increasing the glass thickness only to increase surface density of a panel. As the data in Table 3 shows, use of an interlayer having an interlayer thickness factor of about 0.80 or greater in a multiple layer panel contributes more to improved damping or sound insulation. The symmetry of core layer of the interlayer in the panel has little effect on sound insulation in a glass panel of symmetric glass configuration.

A similar trend of increased damping loss factor for comparative panel C-LG10 and disclosed panels D-LG8 to D-LG13 is shown as the interlayer thickness factor increased with both symmetrical and asymmetrical core layer positions. These panels had 2.3 mm/1.9 mm configuration (combined glass thickness of 4.2 mm, the same as the glass panels of C-LG8 and C-LG9 and D-LG1 through D-LG7), but a slight reduction in the symmetry of glass from 1 to 0.83, and the surface density increased from 11.0 to 12.7 kg/m$^2$ as the interlayer thickness factor in these panels increased from 0 to 4.6. The interlayer in these panels had only one core layer (like in panels C-LG8, C-LG9 and D-LG1 to D-LG5), and the symmetry of core layer varied from 1 to 0.14. Improvements of up to 0.04 in damping loss factor was achieved when the interlayer thickness factor was increased from 0 to 4.6, regardless of the symmetry of the core layer in the interlayer, but was slightly lower than the increase achieved with symmetrically configured glass panels (D-LG1 to D-LG5) having the same interlayer thickness factors. Asymmetrical panels D-LG8 to D-LG13 (symmetry of glass of 0.83) exhibited reduced damping compared to the symmetric panels, indicating an adverse effect of the symmetry of glass on damping or sound insulation. Disclosed panels D-LG8 to D-LG13 again demonstrate that damping loss factor or sound insulation of a highly symmetric laminated glass can be increased by increasing the surface density by increasing the interlayer thickness factor.

Glass panels C-LG11 and C-LG12 (3 mm/1.25 mm configuration, combined glass thickness of 4.2 mm (the same combined glass thickness as the glass panels C-LG8 to C-LG10 and D-LG1 to D-13), surface densities of 11.0 and 11.4 kg/m$^2$ and interlayer thickness factor of 0) each have a symmetry of glass of 0.42 and symmetry of core layer of 1. These panels show damping loss factors of about 0.20 to 0.21, significantly lower than glass panels C-LG9 and C-LG10, which have the same interlayers but have higher symmetry of glass levels (0.83 to 1). When the interlayer thickness factor in C-LG11 is increased from 0 to 1.8 and 4.6 to create glass panels D-LG14 and D-LG15 (by combining PVB-5 with two PVB-4 sheets and PVB-5 with two PVB-1 sheets in a manner to maintain the symmetry of the core layer of 1), there is only a small change in the damping as the loss factors are about 0.21 and 0.22. Stated differently, in a glass panel having a symmetry of core layer of 1 and low symmetry of glass, increasing surface density through increasing the interlayer thickness factor (for example, from 0 to 4.6) resulted in a less dramatic change in the damping loss factor of the glass panel. In contrast, glass panels D-LG16 to D-LG21 (also having 3 mm/1.25 mm configuration with a combined glass thickness of 4.2 mm and symmetry of glass of 0.42, and surface density of 11.0 to 12.7 kg/m$^2$, interlayer thickness factors of 1.8 to 4.6, and symmetry of core layer less than 1) exhibited higher damping loss factors than the comparative panels C-LG11 and C-LG12. As shown in Table 3, increasing surface density of glass panels C-LG11 and C-LG12 by increasing the interlayer thickness factor to create glass panels D-LG14 to D-LG21 increased the damping loss factor of the panels. The damping loss factor trended higher as the interlayer thickness factor increased. Improvements of up to 0.05 in damping loss factor were obtained when the interlayer thickness factor of the glass panels increased from 0 to 4.6, similar to the increases shown with higher symmetry glass panels D-LG1 to D-LG5 (symmetry of glass=1) and D-LG10 to D-LG13 (symmetry of glass=0.83). Thus, to improve the damping of a highly asymmetric glass panel, increasing interlayer thickness factor is a more effective tool with panels having an asymmetric interlayer than a symmetric interlayer. Stated differently, for a highly asymmetric glass panel, the damping can be more effectively improved by the use of an asymmetric interlayer with an interlayer thickness factor greater than about 0.80. It is expected that further increasing the interlayer thickness factor of the glass panel will increase the damping further. For a symmetric multilayer interlayer, the interlayer thickness factor of the panel needs to be higher to improve the damping of a low symmetry glass panel than for an asymmetric multilayer interlayer.

Glass panel D-LG22 contains two core layers in the interlayer each with a symmetry of core layer of 0.33, and glass panel D-LG23 contains three core layers in the interlayer with two asymmetric core layers (0.2, 0.2) and one symmetric core layer. Both disclosed panels were made with 3 mm/1.25 mm glass sheets, and the interlayer thickness factors were 3.4 and 6, respectively. Panels D-LG22 and D-LG23 exhibited loss factors of 0.33 and 0.40, substantially higher than the loss factor of panels having only one core layer (C-LG11 and C-LG12 and D-LG14 to D-LG21). As shown by the data, the presence of the multiple core layers in D-LG22 and D-LG23 combined with a large interlayer thickness factor provided additional damping layer and subsequently increased the damping loss factors. Disclosed panels D-LG14 to D-LG23 demonstrate that damping loss factor or sound insulation of an asymmetric laminate glass can be increased by increasing its surface density by using an interlayer having a higher interlayer thickness factor. This same improvement cannot be achieved by increasing the glass thickness only. In addition, asymmetrically positioning the core layer in the interlayer (symmetry of core layer of less than 1) can be more effective than using a symmetric interlayer (symmetry of core layer of 1) to improve the sound insulation of a low symmetry glass panel. Furthermore, adding one (or more) core layer to an interlayer such that the interlayer contains two (or more) core layers substantially improves the damping of an asymmetrically configured glass panel, similar to the improvement with symmetrically configured glass panels.

Laminated glass panels of the constructions shown in Table 4 were produced by laminating PVB sheet of Table 1, alone or in combinations, between two sheets of glass of varying symmetries. The asymmetry of core layer in the interlayers shown in glass panels D-LG24 and D-LG25, D-LG26 and D-LG27, and D-LG29 and D-LG30 was created in the same manner as previously discussed. Multiple core layers of different core layer symmetries in the interlayers shown in D-LG7, D-LG28 and D-LG31 were produced by combining three PVB-3 tri-layer sheets to form the interlayer having three core layers with symmetries of 0.2, 1, and 0.2, as previously discussed. Details of the panels are summarized in Table 4, below.

The improvements in sound transmission loss at the coincident frequency and in the range between 3000 and 5000 Hz are similar to the improvements in damping loss factors observed with the same symmetric glass panels containing either asymmetric or symmetric interlayers again confirming that the sound insulation of a symmetric laminated glass panel can be improved by increasing the surface density of the panel by increasing the interlayer thickness factor of the panel.

Comparative glass panel C-LG1 and disclosed glass panels D-LG26 to D-LG28 have combined glass thickness of 3.7 mm, symmetry of glass of 0.76, interlayer thickness factors from 0 to 7.3 and surface densities from 10.1 kg/m$^2$ to 11.9 kg/m$^2$. Panel C-LG1 exhibited sound transmission loss of 38.1 dB at the coincident frequency, but increasing the interlayer thickness factor of the panel, and therefore increasing the surface density (from 0 in C-LG1 to 3.9 in

TABLE 4

Comparative and Disclosed Glass Panel Constructions and Sound Insulation Properties

| Glass panel | Interlayer | Interlayer thickness ($H_2$, mm) | Symmetry of soft layer ($S_I = t_2/t_1$) | Glass configuration (mm/mm) | Combined glass thickness (mm) | Symmetry of glass ($S_G = H_3/H_1$) | Surface density (kg/m$^2$) | Interlayer thickness factor | Coincident frequency (Hz) | TL at coincident frequency (dB) |
|---|---|---|---|---|---|---|---|---|---|---|
| C-LG3 | PVB-2 | 0.84 | 1 | 2.1/2.1 | 4.2 | 1 | 11.4 | 0 | 5000 | 38.2 |
| D-LG24 | PVB-2/PVB-1 | 1.6 | 0.35 | 2.1/2.1 | 4.2 | 1 | 12.2 | 3.1 | 5000 | 39 |
| D-LG25 | PVB-2/PVB-1/PVB-1 | 2.36 | 0.22 | 2.1/2.1 | 4.2 | 1 | 13.0 | 5.5 | 5000 | 39.9 |
| D-LG7 | PVB-3/PVB-3/PVB-3 | 2.52 | 0.2; 1; 0.2 | 2.1/2.1 | 4.2 | 1 | 13.2 | 6 | 5000 | 40.9 |
| C-LG1 | PVB-2 | 0.84 | 1 | 2.1/1.6 | 3.7 | 0.76 | 10.1 | 0 | 5000-6300 | 38.1 |
| D-LG26 | PVB-2/PVB-1 | 1.6 | 0.35 | 2.1/1.6 | 3.7 | 0.76 | 10.9 | 3.9 | 5000 | 38.8 |
| D-LG27 | PVB-2/PVB-1/PVB-1 | 2.36 | 0.22 | 2.1/1.6 | 3.7 | 0.76 | 11.8 | 6.8 | 5000 | 39.2 |
| D-LG28 | PVB-3/PVB-3/PVB-3 | 2.52 | 0.2; 1; 0.2 | 2.1/1.6 | 3.7 | 0.76 | 11.9 | 7.3 | 5000 | 41 |
| C-LG7 | PVB-2 | 0.84 | 1 | 3.0/0.7 | 3.7 | 0.23 | 10.1 | 0 | 5000 | 34.1 |
| D-LG29 | PVB-2/PVB-1 | 1.6 | 0.35 | 3.0/0.7 | 3.7 | 0.23 | 10.9 | 3.9 | 4000 | 35.8 |
| D-LG30 | PVB-2/PVB-1/PVB-1 | 2.36 | 0.22 | 3.0/0.7 | 3.7 | 0.23 | 11.8 | 6.8 | 4000 | 36.8 |
| D-LG31 | PVB-3/PVB-3/PVB-3 | 2.52 | 0.2; 1; 0.2 | 3.0/0.7 | 3.7 | 0.23 | 11.9 | 7.3 | 4000 | 38.3 |

As shown in Table 4, comparative glass panel C-LG3 contains interlayer PVB-2 with a symmetry of core layer of 1 and interlayer thickness factor of 0. Panel C-LG3 had a combined glass thickness of 4.2 mm, symmetry of glass of 1, and surface density of 10.1 kg/m$^2$, and the panel exhibited sound transmission loss of 38.2 dB at the coincident frequency. Disclosed glass panels D-LG24 and D-LG25 have the same symmetric glass configurations as C-LG3 but different symmetries of core layer and surface densities (12.2 kg/m$^2$ and 13 kg/m$^2$, higher than C-LG3 due to the higher interlayer thickness factor of 3.1 and 5.5). As the interlayer thickness increased, the disclosed panels exhibited sound transmission loss of 39 and 39.9 dB at the coincident frequency, an increase of 0.8 and 1.7 dB, respectively, compared to comparative glass panel C-LG3. Glass panel D-LG7 (containing an interlayer having three core layers with the symmetries of each core layer at 0.2, 1, and 0.2, interlayer thickness factor of 6) had sound transmission loss of 40.9 dB, a 2.7 dB improvement over glass panel C-LG3.

Figure 5:
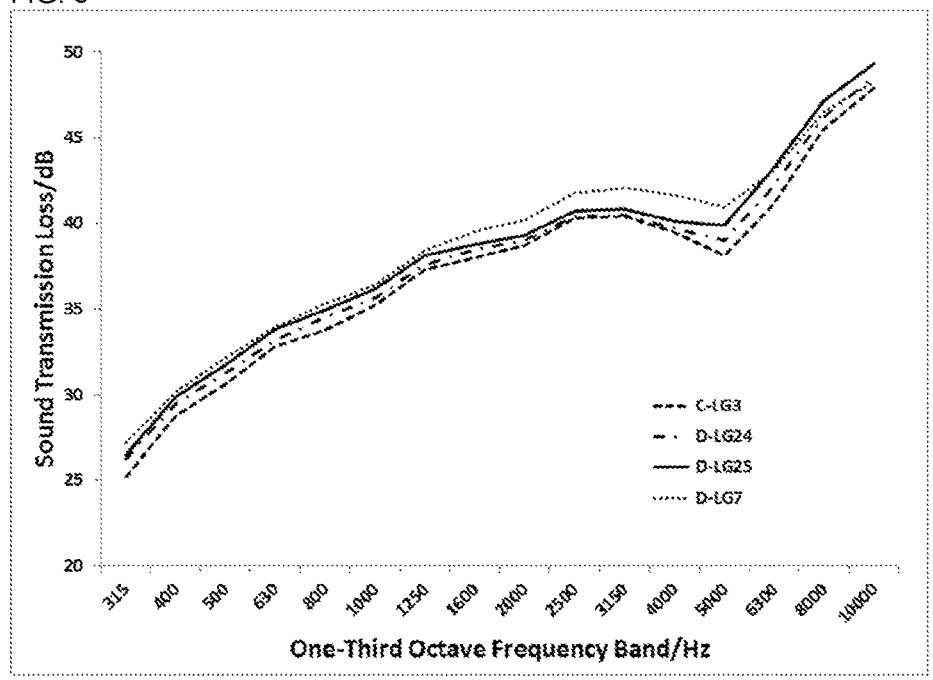
FIG. 5 a graph of the sound transmission loss of several multiple layer panels formed and tested as described in Example 2.

FIG. 5 plots sound transmission loss for C-LG3, D-LG7, D-LG24 and D-LG25 in the frequency range of 315 to 10000 Hz. As shown in FIG. 5, in addition to the improvement at the coincident frequency, increasing surface density of a glass panel by increasing the interlayer thickness factor (from 0 in C-LG3 to 3.1 in D-LG24, 5.5 in D-LG25 and 6 in D-LG7) also increased the sound transmission loss in the frequency between 3000 and 5000 Hz. This is in contrast to a small decrease in the sound transmission in the same frequency range for the panel where the surface density was increased by increasing the thickness of glass (see FIG. 3).

D-LG26 and 6.8 in D-LG27) increased the sound transmission loss to 38.8 and 39.2 dB, 0.7 to 1.2 dB higher than that of comparative panel C-LG1. Glass panel D-LG28 (containing an interlayer having three core layers with the symmetries of each core layer at 0.2, 1, and 0.2 and interlayer thickness factor of 7.3) further increased the sound transmission loss to 41 dB, a 2.9 dB improvement over glass panel C-LG1.

Figure 6:
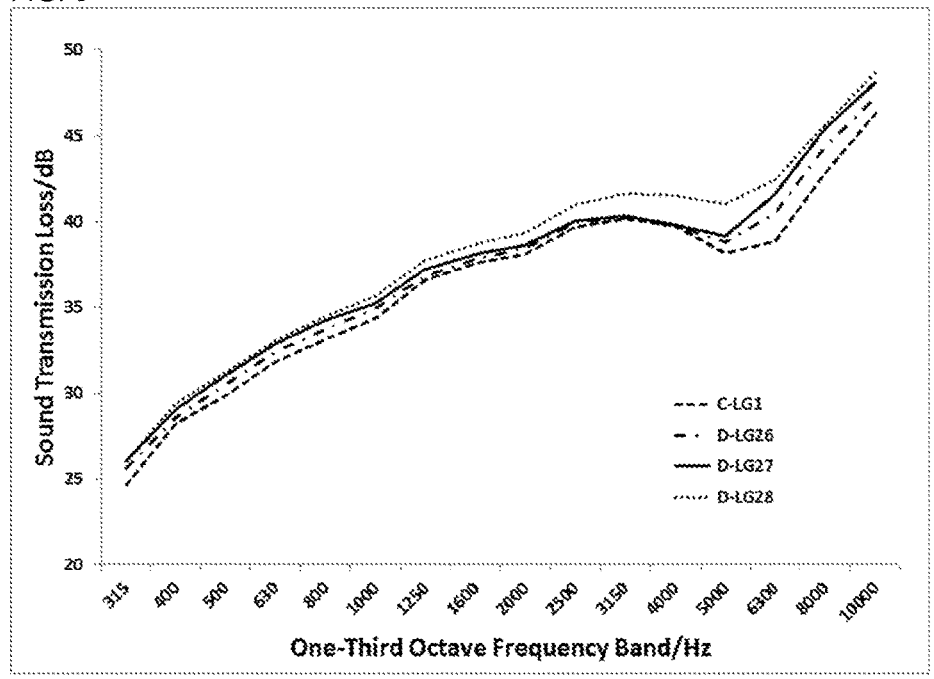
FIG. 6 is a graph of the sound transmission loss of several additional multiple layer panels formed and tested as described in Example 2.

FIG. 6 plots sound transmission loss for C-LG1 and D-LG26 to D-LG28 in the frequency range of 315 to 10000 Hz. FIG. 6 further shows graphically the improvement in sound transmission loss when the surface density of a laminated glass panel is increased by increasing the interlayer thickness factor.

Comparative glass panel C-LG7 and disclosed glass panels D-LG29 to D-LG31 have a combined glass thickness of 3.7 mm, interlayer thickness factors ranging from 0 to 7.3 and surface density from 10.1 kg/m$^2$ to 11.9 kg/m$^2$, which are the same as in glass panels C-LG1 and D-LG26 to D-LG28. The panels have a symmetry of glass of 0.23, lower than the symmetry of C-LG1 and D-LG26 to D-LG28 (symmetry of glass of 0.76). Panel C-LG7 exhibited sound transmission loss of 34.1 dB at the coincident frequency, 4 dB lower than panel C-LG1. Increasing the interlayer thickness factor, and therefore the surface density, from 0 in C-LG7 to 3.9 in D-LG29 and 6.8 in D-LG30) increased the sound transmission loss to 35.8 and 36.8 dB, 1.7 to 2.7 dB better than comparative panel C-LG7. As previously discussed, sound insulation of a highly asymmetric panel can be more effectively improved by increasing the interlayer thickness with an interlayer of asymmetric configuration. Glass panel D-LG31, containing an interlayer having three core layers with the symmetries of each core layer at 0.2, 1, and 0.2 and interlayer thickness factor of 7.3, further increased the sound transmission loss to 38.3 dB, a 4.2 dB improvement over glass panel C-LG7.

Figure 7:
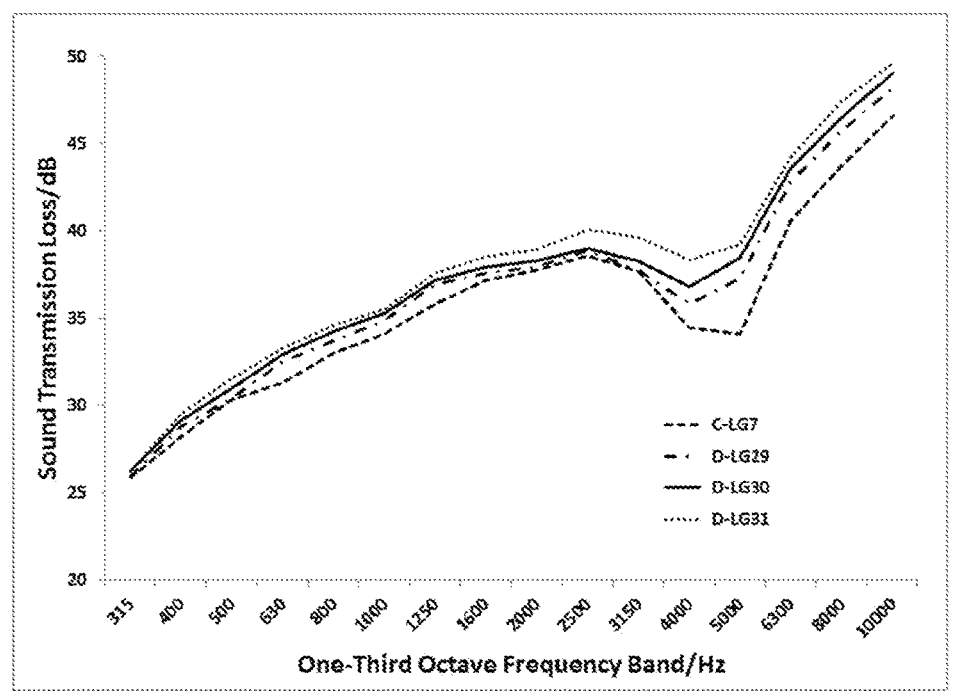
FIG. 7 is a graph of the sound transmission loss of several additional multiple layer panels formed and tested as described in Example 2.

FIG. 7 plots sound transmission loss for C-LG7 (and D-LG29 to D-LG31 in the frequency range of 315 to 10000 Hz. FIG. 7 shows graphically the improvement in sound transmission when the surface density of a laminated glass panel is increased by increasing the interlayer thickness factor. As shown in FIG. 7, an asymmetric interlayer with increased interlayer thickness factor is especially effective at improving the sound transmission loss of a highly asymmetric glass panel, not only at the coincident frequency but also in the frequency range of between 3000 and 5000 Hz.

As previously discussed before, for a highly symmetric acoustic laminated glass panel, the sound transmission loss at the coincident frequency and damping loss factor are independent of the surface density of the panel when the panel's combined glass thickness is increased or decreased. For an acoustic glass panel having a lower symmetry of glass (a highly asymmetric glass panel), the sound transmission loss at the coincident frequency depends on the symmetry of glass; as the surface density is increased or decreased concurrently with small decreases or increases in the symmetry of glass, the sound transmission loss decreases or increases. The disclosed panels in Tables 3 and 4 illustrate that increasing surface density of a glass panel can also be achieved by increasing the interlayer thickness factor. Damping and sound transmission loss at the coincident frequency are increased as the interlayer thickness factor of a panel is increased, as shown above.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. A sound insulating multiple layer panel comprising:
    a first rigid substrate having a first thickness $H_3$,
    a second rigid substrate having a second thickness $H_1$, wherein $H_3 \leq H_1$,
    and a multiple layer acoustic interlayer having a thickness $H_2$ between the first and second rigid substrates, wherein the multiple layer interlayer comprises a first stiff layer having a stiff layer thickness, a second stiff layer having a second stiff layer thickness, and a soft layer between the first and second stiff layers, wherein the soft layer of the multiple layer interlayer is non-centrally located and wherein the glass transition temperature of the soft layer is less than 20° C.,
    and wherein the multiple layer panel has an interlayer thickness factor, $I_f$, of at least 1.00, wherein $I_f=(H_2-0.84) \div [(H_1+H_3)(H_1+H_2+H_3)] \times 100$.

2. The multiple layer panel of claim 1, wherein the multiple layer panel has an interlayer thickness factor, $I_f$, of at least 1.50.

3. The multiple layer panel of claim 1, wherein the multiple layer panel has an interlayer thickness factor, $I_f$, of at least 2.00.

4. The multiple layer panel of claim 1, wherein $H_3 < H_1$.

5. The multiple layer panel of claim 1, wherein $H_3 = H_1$.

6. The multiple layer panel of claim 1, wherein the ratio of $H_3$ to $H_1$ is from 0.23 to 0.95.

7. The multiple layer panel of claim 1, wherein the interlayer further comprises a third stiff layer and a second soft layer, wherein the second soft layer is positioned between the second stiff layer and the third stiff layer.

8. The multiple layer panel of claim 7, wherein the first stiff layer thickness is less than the second stiff layer thickness and the second soft layer is non-centrally located.

9. The multiple layer panel of claim 1, wherein the glass transition temperature of the soft layer is less than 10° C.

10. The multiple layer panel of claim 1, wherein the soft layer has a geometric center location, and wherein the interlayer has a first thickness $t_1$ that is the thickness from the geometric center location to an outer surface of the first stiff layer, and a second thickness $t_2$ that is the thickness from the geometric center location to an outer surface of the second stiff layer, wherein the ratio of $t_2$ to $t_1$ is less than 1.

11. An asymmetric sound insulating multiple layer panel comprising:
    a first rigid substrate having a first thickness $H_3$,
    a second rigid substrate having a second thickness $H_1$, wherein $H_3 < H_1$,
    and a multiple layer acoustic interlayer having a thickness $H_2$ between the first and second rigid substrates, wherein the multiple layer interlayer comprises a first stiff layer having a stiff layer thickness, a second stiff layer having a second stiff layer thickness, and a soft layer between the first and second stiff layers, wherein the soft layer is non-centrally positioned in the interlayer,
    and wherein the multiple layer panel has an interlayer thickness factor, $I_f$, of at least 1.00, wherein $I_f=(H_2-0.84) \div [(H_1+H_3)(H_1+H_2+H_3)] \times 100$.

12. The multiple layer panel of claim 11, wherein the ratio of $H_3$ to $H_1$ is from 0.23 to 0.95.

13. The multiple layer panel of claim 11, wherein the interlayer further comprises a third stiff layer and a second soft layer, wherein the second soft layer is positioned between the second stiff layer and the third stiff layer.

14. The multiple layer panel of claim 13, wherein the first stiff layer thickness is less than the second stiff layer thickness and the second soft layer is non-centrally located.

15. The multiple layer panel of claim 11, wherein the glass transition temperature of the soft layer is less than 20° C.

16. A sound insulating multiple layer panel comprising:
    a first rigid substrate having a first thickness $H_3$,
    a second rigid substrate having a second thickness $H_1$, wherein $H_3 = H_1$, and a multiple layer acoustic interlayer having a thickness $H_2$ between the first and second rigid substrates, wherein the multiple layer interlayer comprises a first stiff layer having a stiff layer thickness, a second stiff layer having a second stiff layer thickness, and a soft layer between the first and second stiff layers, wherein the soft layer is non-centrally positioned in the interlayer, and wherein the multiple layer panel has an interlayer thickness factor, $I_f$, of at least 1.50, wherein $I_f=(H_2-0.84)\div[(H_1+H_3)(H_1+H_2+H_3)]\times 100$.

17. The multiple layer panel of claim 16, wherein the interlayer further comprises a third stiff layer and a second soft layer, wherein the second soft layer is positioned between the second stiff layer and the third stiff layer.

18. The multiple layer panel of claim 16, wherein the first stiff layer thickness is less than the second stiff layer thickness and the second soft layer is non-centrally located.

19. The multiple layer panel of claim 16, wherein the glass transition temperature of the soft layer is less than 20° C.

20. The multiple layer panel of claim 16, wherein the glass transition temperature of the soft layer is less than 10° C.

\* \* \* \* \*